(12) United States Patent
Lin et al.

(10) Patent No.: US 11,378,946 B2
(45) Date of Patent: Jul. 5, 2022

(54) PREDICTIVE MAINTENANCE METHOD FOR COMPONENT OF PRODUCTION TOOL AND COMPUTER PROGRAM PRODUCT THEREROF

(71) Applicant: NATIONAL CHENG KUNG UNIVERSITY, Tainan (TW)

(72) Inventors: Chin-Yi Lin, Taipei (TW); Yu-Ming Hsieh, Kaohsiung (TW); Fan-Tien Cheng, Tainan (TW); Hsien-Cheng Huang, Taoyuan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 90 days.

(21) Appl. No.: 16/857,178

(22) Filed: Apr. 24, 2020

(65) Prior Publication Data

US 2020/0341459 A1 Oct. 29, 2020

(30) Foreign Application Priority Data

Apr. 26, 2019 (TW) ................................. 108114804

(51) Int. Cl.
*G05B 23/02* (2006.01)
*G05B 19/418* (2006.01)

(52) U.S. Cl.
CPC ..... *G05B 23/0283* (2013.01); *G05B 19/4183* (2013.01); *G05B 19/4184* (2013.01); *G05B 19/41875* (2013.01); *G05B 23/0281* (2013.01)

(58) Field of Classification Search
None
See application file for complete search history.

(56) References Cited

U.S. PATENT DOCUMENTS 4,658,245 A * 4/1987 Dye .................. G05B 19/4065
340/683
6,928,398 B1 * 8/2005 Fang ..................... G06Q 10/06
703/2

(Continued)

FOREIGN PATENT DOCUMENTS

CN 1361861 A 7/2002
CN 103675525 A 3/2014

(Continued)

OTHER PUBLICATIONS

Mahan et al., "White Noise Test: detecting autocorrelation and nonstationarities in long time series after ARIMA modeling", Jun. 2015, Proc. of The 14th Python in Science Conf., pp. 100-102 (Year: 2015).*

*Primary Examiner* — Mohammad Ali
*Assistant Examiner* — David Earl Ogg
(74) *Attorney, Agent, or Firm* — CKC & Partners Co., LLC

(57) ABSTRACT

Embodiments of the present invention provide a predictive maintenance method for a component of a production tool, in which a time series prediction (TSP) algorithm and an information criterion algorithm are adapted to build a TSP model, thereby forecasting the complicated future trend of accidental shutdown of the component of the production tool. In addition, an alarm scheme is provided for performing maintenance immediately when the component is very likely to enter a dead state, and a death related indicator (DCI) is provided for quantitatively showing the possibility of the component entering the dead state.

18 Claims, 10 Drawing Sheets

(56) References Cited

U.S. PATENT DOCUMENTS

| | | | |
|---|---|---|---|
| 7,593,912 B2 | 9/2009 | Cheng et al. | |
| 7,603,328 B2 | 10/2009 | Cheng et al. | |
| 8,095,484 B2 | 1/2012 | Cheng et al. | |
| 8,688,256 B2 | 4/2014 | Cheng et al. | |
| 8,862,525 B2 | 10/2014 | Cheng et al. | |
| 8,983,644 B2 | 3/2015 | Cheng et al. | |
| 10,242,319 B2 | 3/2019 | Cheng et al. | |
| 2002/0013687 A1 | 1/2002 | Ortoleva | |
| 2006/0095292 A1* | 5/2006 | Cumming | G06Q 40/04 703/2 |
| 2006/0129257 A1* | 6/2006 | Chen | G05B 19/4184 700/96 |
| 2006/0161403 A1* | 7/2006 | Jiang | G06F 17/18 703/2 |
| 2014/0025315 A1* | 1/2014 | Cheng | G05B 23/024 702/34 |
| 2015/0180740 A1* | 6/2015 | Yoshida | H04L 43/04 370/252 |
| 2016/0349736 A1* | 12/2016 | Cheng | H01L 22/20 |
| 2017/0076216 A1* | 3/2017 | Akrotirianakis | G06N 7/005 |
| 2018/0272491 A1* | 9/2018 | Yang | B23Q 17/2457 |
| 2020/0116553 A1* | 4/2020 | Hsia | G01M 7/02 |
| 2020/0133830 A1* | 4/2020 | Sharma | G06Q 10/06312 |
| 2021/0048807 A1* | 2/2021 | Zhou | G06F 17/18 |

FOREIGN PATENT DOCUMENTS

| | | | |
|---|---|---|---|
| CN | 106089753 A | | 11/2016 |
| CN | 108535656 A | | 9/2018 |
| CN | 108681277 A | | 10/2018 |
| CN | 109063366 A | * | 12/2018 |
| CN | 109145773 A | | 1/2019 |
| CN | 109165396 A | | 1/2019 |
| TW | 200716504 A | | 5/2007 |
| TW | 201411763 A | | 3/2014 |
| TW | I481978 B | | 4/2015 |
| TW | I521360 B | | 2/2016 |
| TW | I539298 B | | 6/2016 |

* cited by examiner

US 11,378,946 B2

PREDICTIVE MAINTENANCE METHOD FOR COMPONENT OF PRODUCTION TOOL AND COMPUTER PROGRAM PRODUCT THEREROF

RELATED APPLICATIONS

The present application is based on, and claims priority from Taiwan Application Serial Number 108114804, filed Apr. 26, 2019, the disclosure of which is hereby incorporated by reference herein in its entirety.

BACKGROUND

Field of Invention

The present invention relates to a predictive maintenance method for a component of a production tool and a computer program product thereof. More particularly, the present invention relates to a predictive maintenance method for a component of a production tool based on remaining useful life (RUL) prediction and a computer program product thereof.

Description of Related Art

Production equipment is an essential part for any manufacturing factory. Failure of a component, a module, or a device (such as a heater, a pressure module, and a throttle valve, etc.) in the production equipment may cause production abnormalities which lead to poor product quality and/or low production capacity and thus cause significant losses.

In general, the most-commonly utilized approach for remedying the aforementioned problems is to perform scheduled preventive maintenance (PM). That is, to execute maintenance-related operations at a predetermined time interval. The predetermined time interval is basically decided according to the mean-time-between-failure (MTBF) of the target device (TD). As such, how to schedule a proper PM is usually a key issue for the factories. An improper scheduled PM may increase the maintenance cost or lower the production capacity.

Predictive maintenance aims to find out when the target device (TD, such as a component of a production tool) is sick and about to die before its occurrence to conduct just-in-time maintenance, so as to avoid unexpected TD down time. In this way, not only tool availability and manufacturing quality are improved, but also the additional cost of excessive maintenance in preventive maintenance strategy can also be reduced.

To improve equipment maintenance programs for increasing fab performance, the International SEMATECH Manufacturing Initiative (ISMI) proposed an initiative of predictive and preventive maintenance (PPM). As defined by ISMI, PPM includes preventive maintenance (PM), condition-based maintenance (CbM), predictive maintenance (PdM), and breakdown maintenance (BDM). Among them, the ISMI claimed that CbM and PdM capabilities should be developed and available as an individual module or incremental modules so that an end user can choose to implement one, some, or all of the capabilities. CbM is defined as: "Maintenance is performed after one or more indicators show that equipment is going to fail or that equipment performance is deteriorating." The technique of fault-detection-and-classification (FDC) is an approach related to CbM and is defined as: "Monitoring equipment and factory data to assess equipment health, and invoking warnings and/or tool shutdown when a fault is detected." On the other hand, PdM is the technique of applying a predictive model to relate facility-state information to maintenance information for forecasting the remaining useful life (RUL) and the need for maintenance events that will alleviate unscheduled downtime.

Among the predictive maintenance technologies proposed by many scholars, an exponential model is commonly applied to predict the remaining useful life (RUL) of TD. However, the prediction from the exponential model is not accurate. Hence, there is a need to provide a predictive maintenance (BPM) method for a component of a production tool and a computer program product thereof to overcome the disadvantages of the aforementioned conventional skill.

SUMMARY

Due to the limitations of the conventional algorithm, when TD is about to die, if the TD's aging feature suddenly rises or becomes smooth, the exponential model may not be able to keep up with the real-time prediction or even falsely predicts a long RUL for the TD.

An object of the present invention is to provide a predictive maintenance method for a component (TD) of a production tool and a computer program product thereof for accurately predicting the RUL of the component of the production tool in real time, thereby performing maintenance on the component of the production tool in time.

Another object of the present invention is to provide a predictive maintenance method for a component (TD) of a production tool and a computer program product thereof for performing maintenance immediately when the component is very likely to enter a dead state, and quantitatively showing the possibility of the component entering the dead state, by using a pre-alarm scheme and a death related indicator (DCI).

According to an aspect of the present invention, a predictive maintenance method is provided. In the predictive maintenance method, at first, plural sets of process data used or generated by a component of a production tool are obtained when plural workpieces are processed in sequence, in which each of the sets of process data includes values of plural parameters, the values of each of parameters in each of the sets of process data is a set of time series data values within a period of processing time when the component of the production tool is processing one of the workpieces, and the sets of process data are one-to-one corresponding to the sets of workpieces. Then, plural event indicative values are obtained according to if an abnormal event occurs when the component is processing each of the workpieces, in which the event indicative values are one-to-one corresponding to the sets of process data. Thereafter, the set of time series data values of each of the parameters in each of the sets of process data is converted to a value of a parameter indicator by using plural algorithms respectively, in which the parameter indicators are one-to-one corresponding to the parameters. Then, a correlation analysis between each of parameter indicators and the event indicative values is conducted, thereby obtaining plural correlation coefficients one-to-one corresponding to the parameter indicators. Thereafter, one of the parameter indicators that is corresponding to a maximum one of the correlation coefficients is selected as an aging feature ($y_T$). Thereafter, a first determination operation is performed to determine if the component is in a sick state according to the value of the aging feature ($y_T$) corresponding to each of the workpieces, in which one of the workpieces is set as a sample selection point once the component is in the sick state when processing the one of the workpieces. Then, N values of the aging feature are used as a set of model-building sample data, in which the N values of the aging feature ($y_T$) are corresponding to N sets of the sets of process data belonging to N of the workpieces that are processed before the sample selection point, where N is a positive integer. Then, a model-building operation is performed to build an aging-feature prediction model by using the set of model-building sample data in accordance a time series prediction algorithm, thereby obtaining plural predicted values of the aging feature ($y_T$) that are arranged in a processing order. Thereafter, plural time points at which the component processes the workpieces respectively are obtained in accordance with plural process times used by the component for processing the workpieces respectively. Thereafter, a dead spec is obtained, in which the dead spec is a value of the aging feature ($y_T$) used or generated by the component when the component cannot work. Then, an operation is performed to sequentially determine if the predicted values are substantially equal to the dead spec until an earliest one of the predicted values is found, in which one of the time points corresponding to the earliest one is a death time point at which the component cannot work. Then, an operation is performed to compute differences between the death time point and the respective time points at which the workpieces are processed, thereby obtaining plural predicted remaining useful life values ($RUL_t$), where t stands for the $t^{th}$ workpieces and t is an integer.

In some embodiments, in the first determination operation, the values of the aging feature ($y_T$) in each of the sets of process data are first converted to plural device health indices (DHI) in accordance with a set of conversion formulas as follows:

when $\bar{y}_T < y_T < UCL$, $$DHI = \bar{y}_{T\_mapping} - \left( \frac{y_T - \bar{y}_T}{UCL - \bar{y}_T} \times (\bar{y}_{T\_mapping} - UCL_{\_mapping}) \right);$$

when $UCL < y_T < USL$, $$DHI = UCL_{\_mapping} - \left( \frac{y_T - UCL}{USL - UCL} \times (UCL_{\_mapping} - USL_{\_mapping}) \right);$$

when $USL < y_T < \text{Max } y_T$, $$DHI = USL_{\_mapping} - \left( \frac{y_T - UCL}{USL - USL} \times (USL_{\_mapping} - \text{Max} y_{T\_mapping}) \right);$$

when $LCL < y_T < \bar{y}_T$, $$DHI = \bar{y}_{T\_mapping} - \left( \frac{y_T - USL}{\text{Max } y_T - USL} \times (\bar{y}_{T\_mapping} - LCL_{\_mapping}) \right);$$

when $LSL < y_T < LCL$, $$DHI = LCL_{\_mapping} - \left( \frac{LCL - y_T}{LCL - LSL} \times (LCL_{\_mapping} - LSL_{\_mapping}) \right);$$

when $\text{Min } y_T <_T < LSL$, $$DHI = LSL_{\_mapping} - \left( \frac{LSL - y_T}{LSL - \text{Min} y_T} \times (\text{Min} y_{T\_mapping} - LSL_{\_mapping}) \right);$$

where $\bar{y}_T$ represents the mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; $LCL_{\_mapping}$ is a conversion value corresponding to the LCL; $USL_{\_mapping}$ is a conversion value corresponding to the USL; and $UCL_{\_mapping}$ is a conversion value corresponding to the UCL. Then, an operation is performed to sequentially determine if the device health indices are greater or equal to a threshold value until an earliest one of the device health indices is found, in which one of the workpieces corresponding to the earliest one of the device health indices is set as the sample selection point.

In some embodiments, the model-building operation includes building the aging-feature prediction model by using an autoregressive integrated moving average (ARIMA) model as the time series prediction algorithm, in which the ARIMA model comprising a moving average (MA) model and an autoregressive (AR) model; selecting the biggest lag of the MA model by using an autocorrelation function (ACF), and selecting the biggest lag of the AR model by using a partial autocorrelation function (PACF); performing a white noise test on the values of the aging feature in the set of model-building sample data, wherein when one of the values of the aging feature in the set of model-building sample data is a white noise, a value of the aging feature corresponding to another set of process data belonging to a $(N+1)^{th}$ workpiece processed before the selection sample point is added to the set of model-building data; creating a plurality of ARIMA model combinations by using the biggest lag of the MA model and the biggest lag of the AR model; calculating an information quantity of each of the ARIMA model combinations by using an information criterion algorithm; and selecting one of the ARIMA model combinations that has the biggest information quantity as an optimal model.

In some embodiments, the information criterion algorithm is a Bayesian information criterion (BIC) or an Asaike information criterion (AIC).

In some embodiments, the model-building operation includes determining if variances of the values of the aging feature in the set of model-building sample data become larger with time, and performing a log transformation on each of the values of the aging feature in the set of model-building sample data when the variances of the values of the aging feature in the set of model-building sample data become larger with time; performing a unit root test on the values of the aging feature in the set of model-building sample data to check if the values of the aging feature in the set of model-building sample data arranged in sequence is stationary, and performing a process of difference on each of the values of the aging feature in the set of model-building sample data when the values of the aging feature in the set of model-building sample data is not stationary.

In some embodiments, the unit root test is an augmented Dickey-Fuller test (ADF test) or a Kwiatkowski-Phillips-Schmidt-Shin (KPSS) test.

In some embodiments, the aforementioned predictive maintenance method further includes performing a second determination operation to determine if the component of the production tool needs replacement or maintenance. The second determination operation includes determining if $(RUL_t - RUL_{t-1})/RUL_{t-1}$ is greater than or equal to a threshold, thereby obtaining a first result, where t-1 stands for the (t−1)$^{th}$ workpiece; determining if RUL$_t$ is smaller than a maintenance buffer time, thereby obtaining a second result, in which the component of the production tool has to be maintained within the maintenance buffer time when being abnormal. When the first result and the second result both are false, the component of the production tool is in a sick state but does not deteriorate drastically, and no maintenance is needed. When the first result is false and the second result is true, the component of the production tool does not deteriorate drastically but its remaining useful life is sufficient, and maintenance is needed. When the first result is true and the second result is false, the component of the production tool deteriorates drastically, and if the first result for each of the t$^{th}$ workpiece to the (t+p)$^{th}$ workpiece that are successively processed by the component of the production tool is true and the second result for the for each of the t$^{th}$ workpiece to the (t+p)$^{th}$ workpiece is false, inspection or maintenance is needed, wherein p is a positive integer. When the first result and the second result both are true, the component of the production tool needs maintenance.

In some embodiments, the aforementioned predictive maintenance method further includes performing a second determination operation to determine if the component of the production tool needs replacement or maintenance. The second determination operation includes converting the predicted values of the aging feature (y$_T$) to plural death correlation indices (DCI) in accordance with a set of conversion formulas as follows:

$$DCI_t = \frac{conv(y_{death}, y_{t-1})}{Var(y_{death})},$$

where y$_{death}$ is the y$_{death}$ is the predicted value of the aging feature when the component cannot work, y$_{t-1}$ is the value of the aging feature corresponding to the (t−1)$^{th}$ workpiece processed by the component, conv is the covariance computation, and Var is the variance computation; and when DCI$_t$ is greater than a threshold, it means that the component is near a dead state when processing the t$^{th}$ workpiece, in which the threshold is based on a standard error of DCI$_t$.

In some embodiments, the component comprises a heater, a pressure module, a throttle valve, an oilless bushing or a bearing, and the parameters comprise a valve opening angle, a vibration amplitude, a driving voltage, a driving current, a temperature and/or a pressure.

In some embodiments, the parameter indicators comprise a k-times frequency feature (where k is greater than 0) after conversion to a frequency domain, a global similarity index (GSI), a kurtosis of statistic distribution, a skewness of statistic distribution, a standard deviation, a root mean square (RMS), a mean value, a maximum value, and/or a minimum value.

According to another aspect of the present invention, a computer program product stored on a non-transitory tangible computer readable recording medium is provided. When this computer program product is loaded and executed by a computer, the aforementioned predictive maintenance method is performed.

Hence, the application of the embodiments of the present invention can accurately predict the RUL of the component of the production tool in real time, so as to perform maintenance on the component of the production tool in time; and can perform maintenance immediately when the component is very likely to enter a dead state, and can quantitatively show the possibility of the component entering the dead state.

BRIEF DESCRIPTION OF THE DRAWINGS

The invention can be more fully understood by reading the following detailed description of the embodiment, with reference made to the accompanying drawings as follows.

DESCRIPTION OF THE PREFERRED EMBODIMENTS

Figure 1:
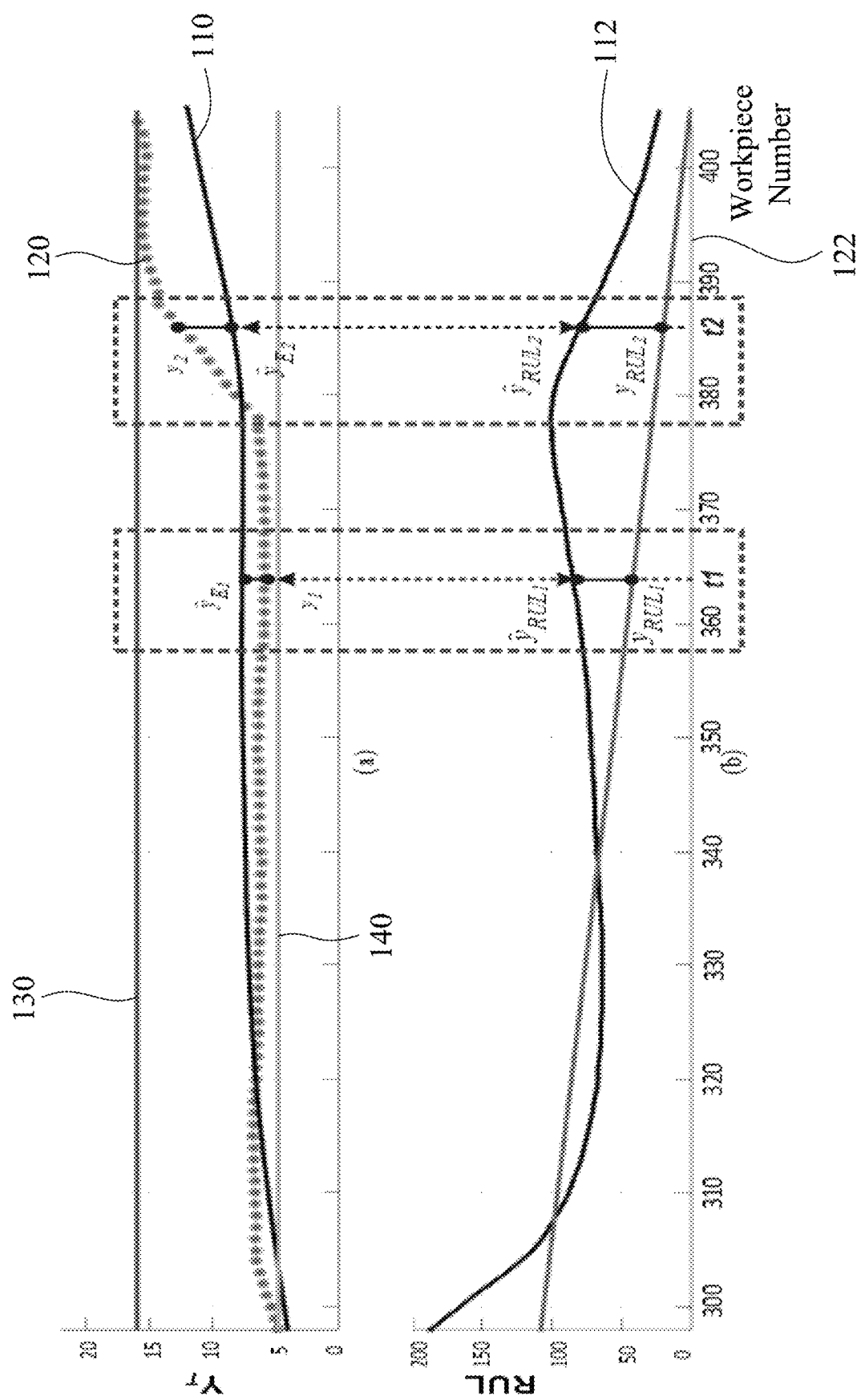
FIG. 1 shows prediction results by using a typical exponential model.

Reference will now be made in detail to the embodiments of the present invention, examples of which are illustrated in the accompanying drawings. Wherever possible, the same reference numbers are used in the drawings and the description to refer to the same or like parts.

Referring to FIG. 1, FIG. 1 shows prediction results of an aging feature and a RUL of a component of a production tool by using a typical exponential model, in which the production tool is a plasma enhanced chemical vapor deposition (PECVD) tool, and the component thereof is a throttle valve in a vacuum module of the PECVD tool; the aging feature is a valve opening of the throttle valve; an workpiece number stands for the order of workpieces processed by the throttle valve. A (predicted aging feature) curve 110 represents predicted values of the aging feature; a (actual aging feature) curve 120 represents actual values of the aging feature; a curve 130 represents a dead spec of the aging feature when the component does not work (i.e. at a dead state); a curve 140 represents a sick spec of the aging feature when the component is at a sick state; a curve 112 represents predicted RUL values of the component; and a (actual RUL) curve 122 represents actual RUL values. As shown a dashed frame in which workpiece number t1 is located, as the predicted aging feature curve 110 goes smooth, the error between its corresponding RUL prediction curve 112 and the actual RUL curve 122 would grows increasingly. As shown a dashed frame in which workpiece number t2 is located, as the actual aging feature curve 120 rises up drastically, the predicted aging feature curve 110 cannot catch up with the aging trend, thus leading to increasing prediction inaccuracy of the corresponding RUL prediction curve 112.

To solve the prediction inaccuracy problem of the typical exponential model for RUL prediction, embodiments of the disclosure provides a time series prediction (TSP) algorithm and adopts an information criterion algorithm to build a time series analysis model, thereby predicting complicated future trends of unscheduled shutdown of the component of the production tool. In addition, embodiments of the disclosure provides an alarm scheme for performing maintenance immediately when the component is very likely to enter a dead state, and provides a death related indicator (DCI) for quantitatively showing the possibility of the component entering the dead state.

Figure 2A:
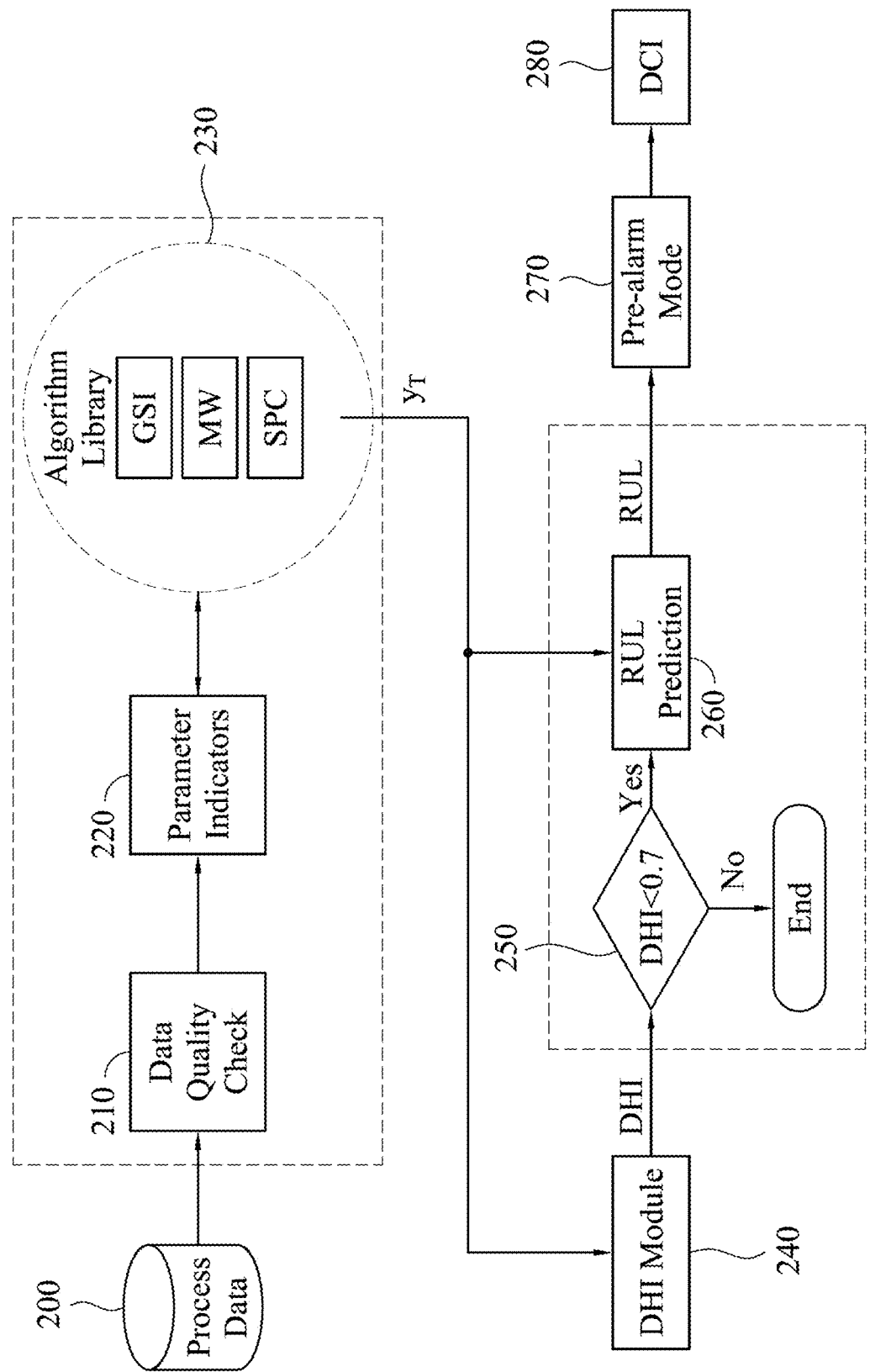
FIG. 2A is schematic block diagram for explaining a predictive maintenance method for a component of a production tool according to some embodiments of the disclosure.

Referring to FIG. 2A, FIG. 2A is schematic block diagram for explaining a predictive maintenance method for a component of a production tool according to some embodiments of the disclosure. At first, plural sets of process data 200 used or generated by a component of a production tool when plural workpieces are processed in sequence by the component, in which each set of process data 200 includes values of plural parameters. The process tool is a tool processing the workpieces on a production line. The production line may be, for example, a semiconductor production line, a TFT-LCD production line, a machine tooling production line, etc.; the workpieces may be, for example, wafers, glass substrates, wheels, screws, etc.; the machine tool may be, for example, a film deposition tool, a photoresist coating tool, a machine tool, etc.; the component may be, for example, a heater, a pressure module, a throttle valve, an oilless bushing, a bearing, etc.; and the parameters includes a valve opening angle, a vibration amplitude, a driving voltage, a driving current, a temperature and/or a pressure, etc., for example. The aforementioned listed items are merely used as examples for explanation, and embodiments of the disclosure are not limited thereto. It is noted that the values of each of parameters in each of the sets of process data 200 is a set of time series data values within a period of processing time when the component of the production tool is processing one of the workpieces, i.e. the values of each of parameters may be shown as a curve of parameter values vs. time. The sets of process data 200 are one-to-one corresponding to the sets of workpieces.

Then, a data quality check is performed on the sets of process data 200 (step 210), thereby determining if the quality of each set of process data 200 is good. If any of the sets of process data 200 has poor quality, another set of process data used or generated by the component of the production tool when another workpiece is processed. Step 200 may adopt the algorithms similar to the process data quality evaluation scheme utilized in U.S. Pat. No. 8,095,484 B2. U.S. Pat. No. 8,095,484 B2 is hereby incorporated by reference.

Thereafter, the set of time series data values of each of the parameters in each of the sets of process data is converted to a value of a parameter indicator by using various algorithms in an algorithm library 230 respectively (step 220), in which the parameter indicators are one-to-one corresponding to the parameters. The parameter indicators include a k-times frequency (where k is greater than 0) after conversion to a frequency domain, a global similarity index (GSI), a kurtosis of statistic distribution, a skewness of statistic distribution, a standard deviation, a root mean square (RMS), a mean value, a maximum value, and/or a minimum value. The conversion method of the parameter indicators may adopt a moving window (MW) method to determine the number of samples.

Figure 2B:
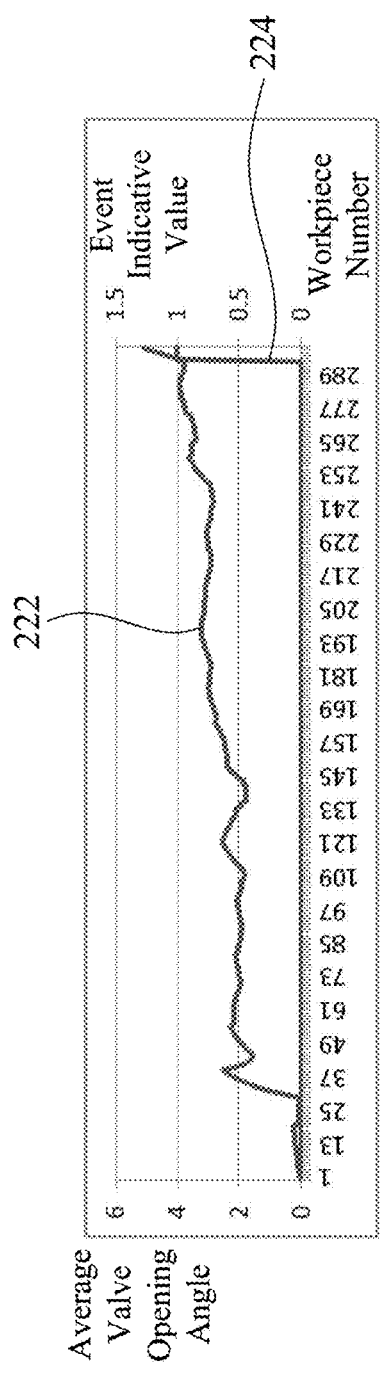
FIG. 2B shows a relationship between an event indicative value and a parameter indicator (an average opening angle of a throttle valve) according to some embodiments of the disclosure.
Figure 2C:
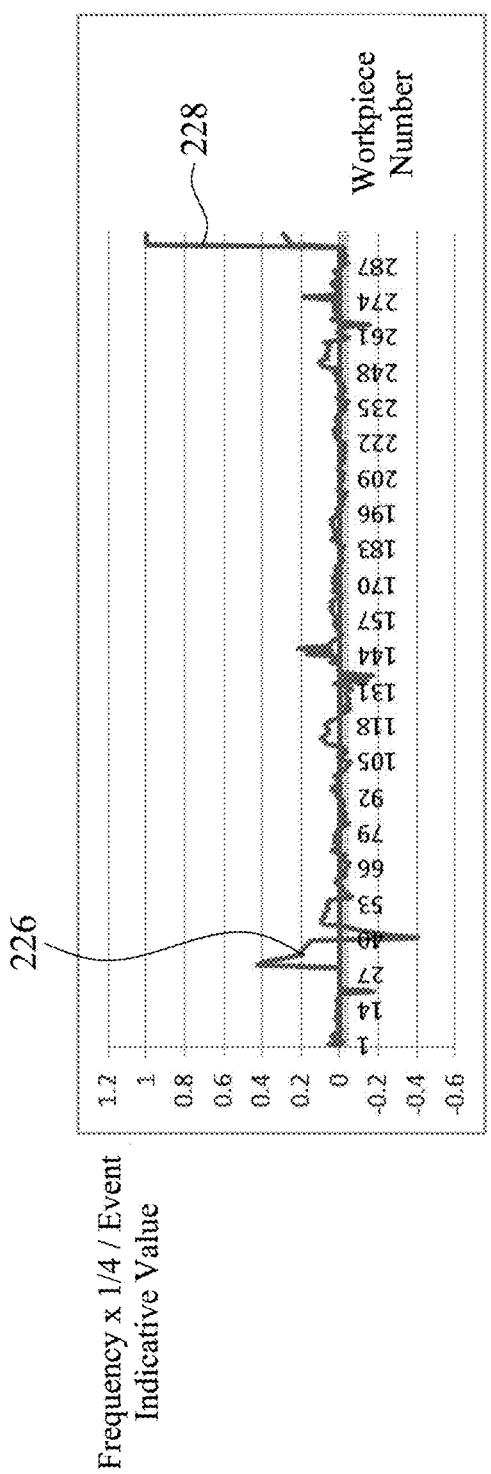
FIG. 2C shows a relationship between an event indicative value and a parameter indicator (a frequency x1/4 feature) according to some embodiments of the disclosure.
Figure 2D:
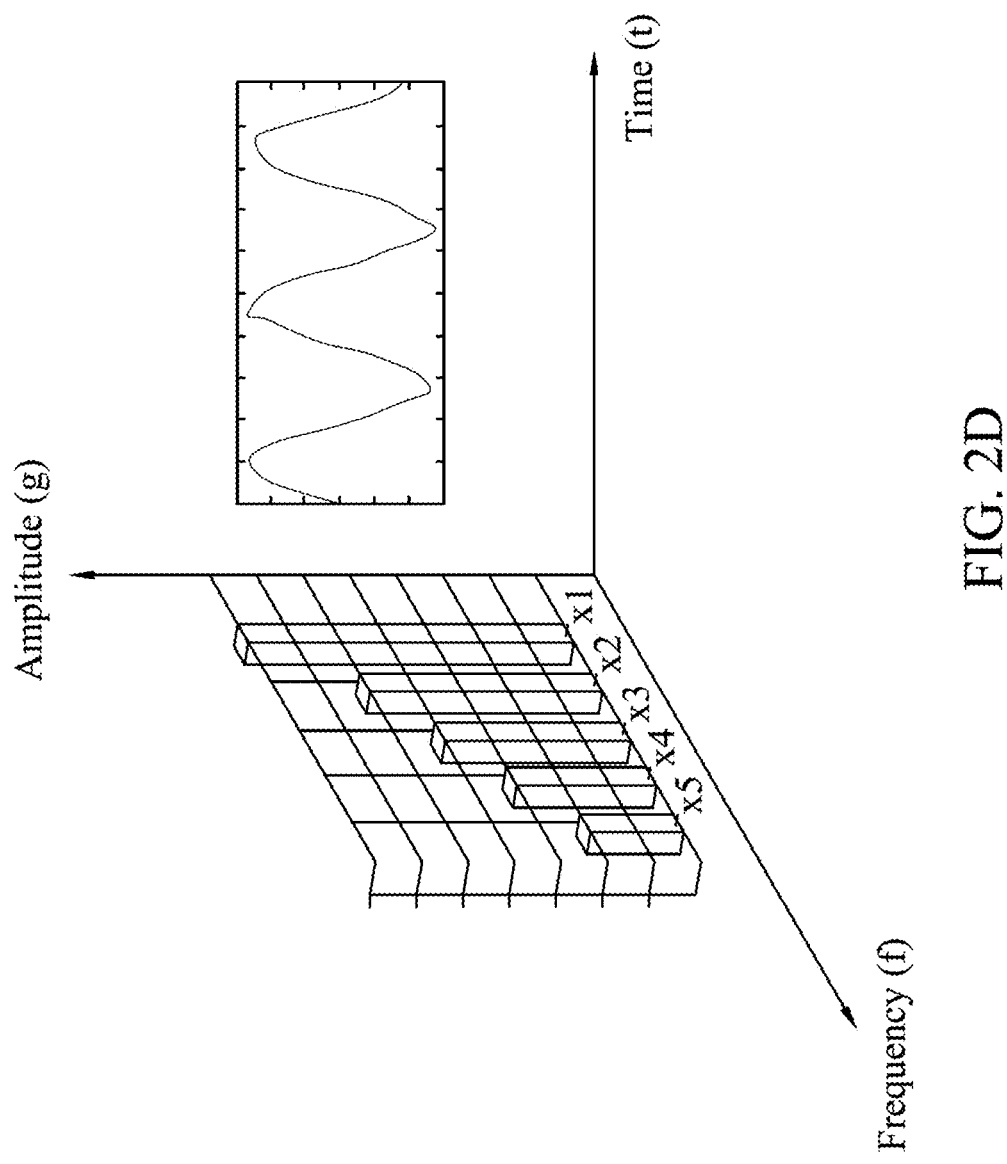
FIG. 2D illustrates exemplary aging features corresponding to time, frequency and time-frequency domains according to some embodiments of the disclosure.

For example, each set of process data 200 includes a set of time series data of valve opening, and/or a set of time series data of vibration amplitude. A statistical process control (SPC) in the algorithm library 230 is used to convert the set of time series data of valve opening to a kurtosis of statistic distribution, a skewness of statistic distribution, and/or a standard deviation. A global similarity index (GSI) algorithm in the algorithm library 230 is used to convert the set of time series data of valve opening to a GSI value. A time-frequency domain conversion method in the algorithm library 230 is used to convert the set of time series data of vibration amplitude to a k-times frequency feature such as a frequency x1/4 feature, a frequency x1/2 feature, a frequency x2 feature, and/or a frequency x4 feature. The GSI algorithm may refer to the algorithms disclosed in U.S. Pat. No. 8,095,484 B2. U.S. Pat. No. 8,095,484 B2 is hereby incorporated by reference. The aforementioned algorithms in the algorithm library 230 are merely used as examples for explanation, and embodiments of the disclosure are not limited thereto. In some embodiments, the frequency-domain methods and time-frequency domain methods may be fast Fourier transform (FFT) or discrete wavelet transform (DWT) etc. which can be used to transform time-domain data into the frequency-domain for deriving power spectral density features of different frequency bandwidths or to transform time-domain data into the time-frequency domain for deriving wavelet energy features of different wavelet nodes. For example, categories of (sample) feature data in frequency domain are [power spectral density 1(frequency x1/4)], [power spectral density 2(frequency x1/2)], [power spectral density 3(frequency x1)], [power spectral density 4(frequency x2)], [power spectral density 5(frequency x3)], as shown in FIG. 2D. The utilization of the aforementioned FFT and DWT are well known to those who are skilled in the art, and are not described in detail herein.

On the other hand, the method of the disclosure obtains plural event indicative values that are one-to-one corresponding to the sets of process data, in which the event indicative values indicate whether an abnormal event occurs when the component of the production tool is processing each of the workpieces. Referring to FIG. 2B, FIG. 2B shows a relationship between an event indicative value and a parameter indicator (an average valve opening angle of a throttle valve) according to some embodiments of the disclosure, in which a curve 222 shows an average valve opening value when the component of the production tool process each of the workpieces, and a curve 224 shows whether an abnormal event occurs when the component of the production tool process each of the workpieces. As shown in FIG. 2B, no abnormal events occur before the component processes the $289^{th}$ workpiece, and thus the event indicative values of the workpieces before the $289^{th}$ workpieces may be "0", for example; and abnormal events occur after the component processes the $289^{th}$ workpiece, and thus the event indicative values after the $289^{th}$ workpieces may be "1", for example. Referring to FIG. 2C, FIG. 2C shows a relationship between an event indicative value and a parameter indicator (a frequency x1/4 feature) according to some embodiments of the disclosure, in which a curve 226 shows a frequency x1/4 feature of vibration amplitude when the component of the production tool process each of the workpieces, and a curve 228 shows whether an abnormal event occurs when the component of the production tool process each of the workpieces. As shown in FIG. 2C, no abnormal events occur before the component processes the $287^{th}$ workpiece, and thus the event indicative values of the workpieces before the $287^{th}$ workpieces may be "0", for example; and abnormal events occur after the component processes the $287^{th}$ workpiece, and thus the event indicative values after the $287^{th}$ workpieces may be "1", for example.

Then, conducting a correlation analysis between each of parameter indicators and the event indicative values, thereby obtaining plural correlation coefficients that are one-to-one corresponding to the parameter indicators, as shown in Table 1. Thereafter, one of the parameter indicators that is corresponding to a maximum one of the correlation coefficients is selected as an aging feature ($y_T$), such as the average valve opening that gas the largest correlation coefficient (0.7517) shown in Table 1.

TABLE 1

| Algorithm | Correlation Coefficients |
| --- | --- |
| average valve opening | 0.7517 |
| frequency × 1/4 feature of vibration amplitude | 0.6845 |
| frequency × 1/2 feature of vibration amplitude | −0.4148 |
| frequency × 1 feature of vibration amplitude | −0.3924 |
| frequency × 2 feature of vibration amplitude | 0.3534 |
| frequency × 3 feature of vibration amplitude | −0.2734 |
| STD of vibration amplitude | −0.2725 |
| skewness of vibration amplitude | −0.2723 |
| Kurtosis of vibration amplitude | −0.2618 |
| RMS of vibration amplitude | 0.1767 |
| Average of vibration amplitude | 0.1454 |
| Max of vibration amplitude | 0.0012 |
| Min of vibration amplitude | 0.0012 |
| GSI of vibration amplitude | 0.0012 |

Then, a first determination operation 250 is performed to determine if the component is in a sick state according to the value of the aging feature ($y_T$) corresponding to each of the workpieces, in which one of the workpieces is set as a sample selection point once the component is in the sick state when processing the one of the workpieces. Hereinafter, an example is provided for explaining an embodiment of the first determination operation 250, but embodiments of the disclosure are not limited thereto. As shown in FIG. 2A, at first, the values of the aging feature ($y_T$) in each of the sets of process data inputted into a device health index (DHI) module, and are converted to plural device health indices (DHI) in accordance with a set of conversion formulas. Thereafter, an operation is performed to sequentially determine if the device health indices are greater or equal to a threshold value (for example 0.7) until an earliest one of the device health indices is found, wherein one of the workpieces corresponding to the earliest one of the device health indices is set as the sample selection point. The set of conversion formulas is listed as follows:

when $\bar{y}_T < y_T < UCL$, (1)

$DHI =$ $\bar{y}_{T\_mapping} - \left(\frac{y_T - \bar{y}_T}{UCL - \bar{y}_T} \times (\bar{y}_{T\_mapping} - UCL_{\_mapping})\right)$;

when $UCL < y_T < USL$, $DHI =$ $UCL_{\_mapping} - \left(\frac{y_T - UCL}{USL - UCL} \times (UCL_{\_mapping} - USL_{\_mapping})\right)$;

when $USL < y_T < \text{Max } y_T$, $DHI = USL_{\_mapping} - \left(\frac{y_T - UCL}{USL - USL} \times (USL_{\_mapping} - \text{Max} y_{T\_mapping})\right)$;

when $LCL < y_T < \bar{y}_T$, (2)

$DHI =$ $\bar{y}_{T\_mapping} - \left(\frac{y_T - USL}{\text{Max } y_T - USL} \times (\bar{y}_{T\_mapping} - LCL_{\_mapping})\right)$;

when $LSL < y_T < LCL$, $DHI =$ $LCL_{\_mapping} - \left(\frac{LCL - y_T}{LCL - LSL} \times (LCL_{\_mapping} - LSL_{\_mapping})\right)$;

when $\text{Min } y_T <_T < LSL$, $DHI = LSL_{\_mapping} - \left(\frac{LSL - y_T}{LSL - \text{Min} y_T} \times (\text{Min} y_{T\_mapping} - LSL_{\_mapping})\right)$;

where $\bar{y}_T$ represents the mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; $LCL_{\_mapping}$ is a conversion value corresponding to the LCL; $USL_{\_mapping}$ is a conversion value corresponding to the USL; and $UCL_{\_mapping}$ is a conversion value corresponding to the UCL. The DHI algorithm is similar to those disclosed in U.S. Pat. No. 10,242,319 B2. U.S. Pat. No. 10,242,319 B2 is hereby incorporated by reference.

Figure 2E:
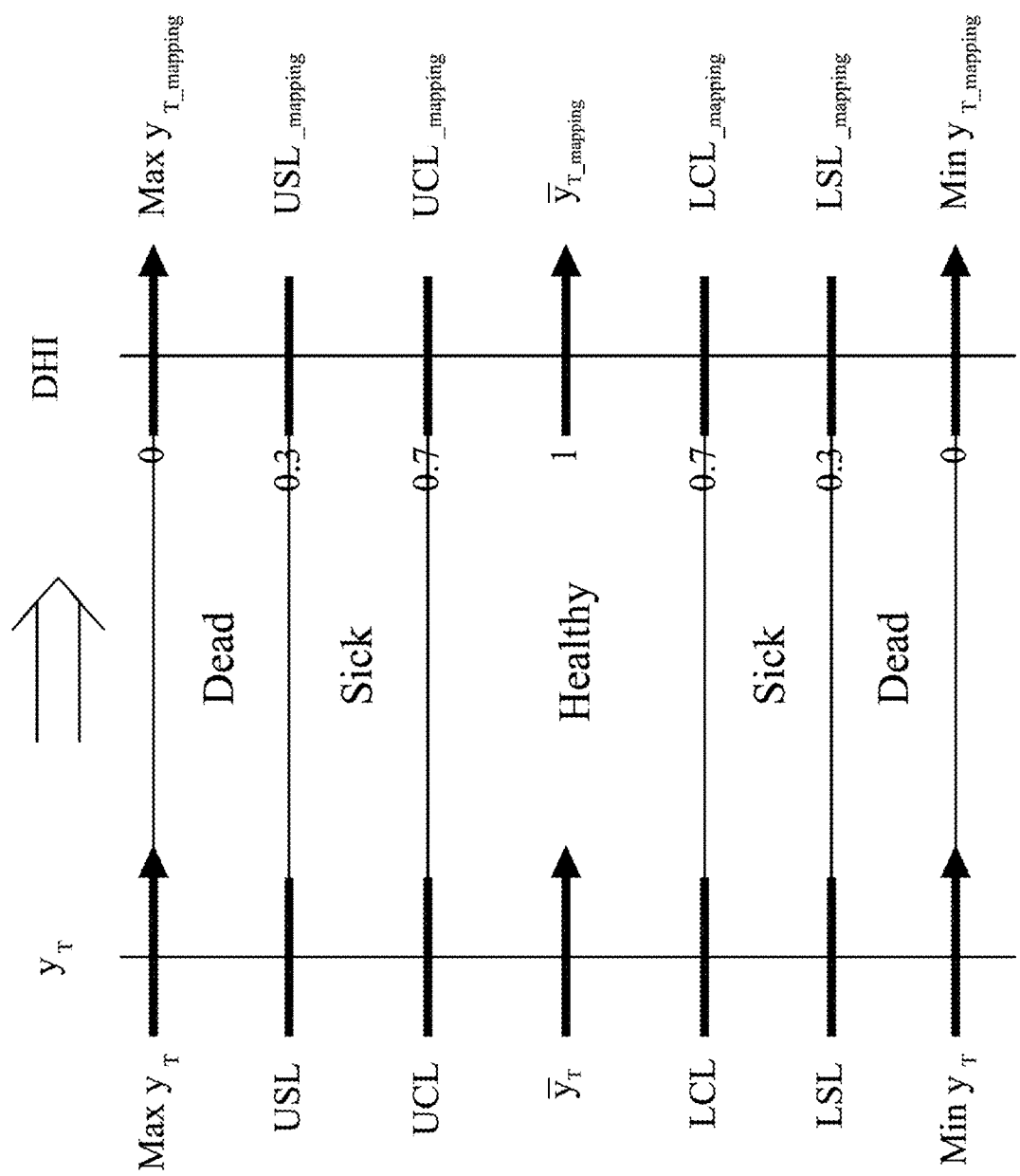
FIG. 2E shows a configuration of SPC control chart of y$_T$ with $\bar{y}_T$ being the baseline value and at the center.
Figure 4:
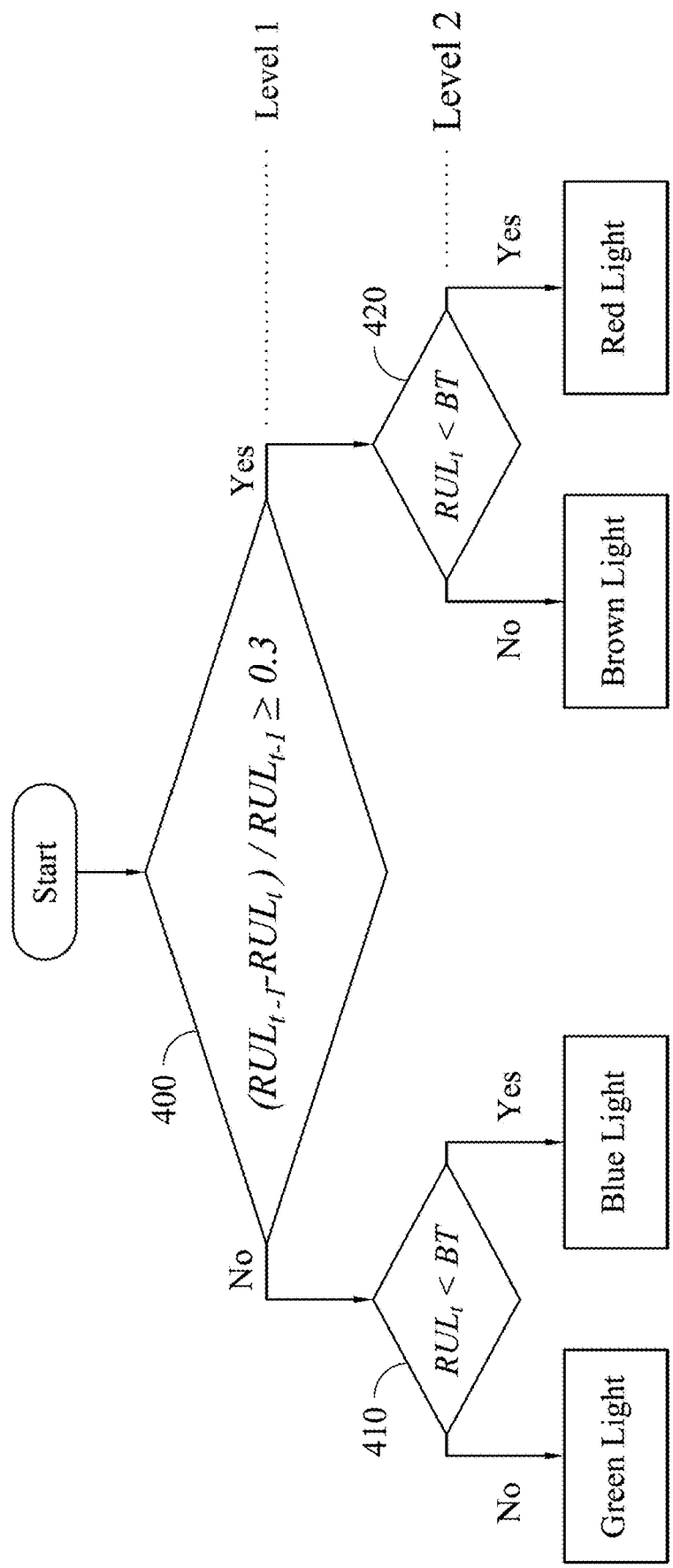
FIG. 4 is schematic block diagram for explaining a pre-alarm mode according to some embodiments of the disclosure.

Generally speaking, on-line SPC schemes are utilized to monitor the quality status during manufacturing processes, and necessary actions are performed if the process is out of statistical control. The DHI scheme applies the concept of on-line SPC to convert $|y_T - \bar{y}_T|$ into DHI. Referring to FIG. 4, FIG. 4 shows a configuration of SPC control chart of $y_T$ with the $\bar{y}_T$ being the baseline value and at the center, indicating a conversion value ($\bar{y}_{T\_mapping}$) corresponding to $\bar{y}_T$; a conversion value (Max $y_{T\_mapping}$) corresponding to Max $y_T$; a conversion value (Min $y_{T\_mapping}$) corresponding to Min $y_T$; a conversion value ($LSL_{\_mapping}$) corresponding to LSL; a conversion value ($LCL_{\_mapping}$) corresponding to LCL; a conversion value ($USL_{\_mapping}$) corresponding to USL; and a conversion value ($UCL_{\_mapping}$) corresponding to UCL, in which Min $y_{T\_mapping}$, $LSL_{\_mapping}$, $LCL_{\_mapping}$, $\bar{y}_{T\_mapping}$, $UCL_{\_mapping}$, $USL_{\_mapping}$ and Max $y_{T\_mapping}$ are 0, 0.3, 0.7, 1, 0.7, 0.3 and 0, for example, respectively. The definitions of the specifications UCL, LCL, USL and LSL are varied with the physical properties of the component of the production tool. For a throttle valve, its UCL and LCL are a nominal angle plus 5 degrees and the nominal angle minus 5 degrees; its USL is the nominal angle plus 50 degrees; and its LSL is the nominal angle minus 20 degrees. Considering the physical properties, when the open angle of the throttle valve is greater than 50 degrees or smaller than 20 degrees, its gas-exhaust efficiency becomes poor; and when its open angle is greater than the nominal angle plus 5 degrees or smaller than the nominal angle minus 5 degrees, its health status should be concerned. UCL, LCL, USL and LSL are common technical measures used by the conventional SPC, and thus are further explained herein. When 0, 0.3, 0.7, 1, 0.7, 0.3 and 0 are introduced into Min $y_{T\_mapping}$, $LSL_{\_mapping}$, $LCL_{\_mapping}$, $\bar{y}_{T\_mapping}$, $UCL_{\_mapping}$, $USL_{\_mapping}$ and Max $y_{T\_mapping}$ in the formulas (1) in the above, the DHI formulas of converting $y_T$ to DHI in the upper half of FIG. 2E are obtained as follows:

when $\bar{y}_T < y_T < UCL$, (1′)

$$DHI = 1 - \left(\frac{y_T - \bar{y}_T}{UCL - \bar{y}_T} \times 0.3\right);$$

when $UCL < y_T < USL$, $$DHI = 0.7\left(\frac{y_T - UCL}{USL - UCL} \times 0.4\right);$$

when $USL < y_T < \text{Max } y_T$, $$DHI = 0.3\left(\frac{y_T - USL}{\text{Max}y_T - USL} \times 0.3\right).$$

By the same token, form the formulas (2) in the above, the formulas of converting yT to DHI in the lower half of FIG. 4 are obtained as follows:

when $LCL < y_T < \bar{y}_T$, (2′)

$$DHI = 1\left(\frac{\bar{y}_T - y_T}{\bar{y}_T - LCL} \times 03\right);$$

when $LSL < y_T < LCL$, $$DHI = 0.7 - \left(\frac{LCL - y_T}{LCL - LSL} \times 0.4\right);$$

when Min $y_T < y_T < LSL$, $$DHI = 0.3\left(\frac{LSL - y_T}{LSL - \text{Min}y_T} \times 0.3\right);$$

where $\bar{y}_T$ represents the mean of the values of the aging feature.

In this embodiment, UCL/LCL and USL/LSL are corresponding to process spec and hard spec of the component of the production tool, and the associated DHI values are 0.7 and 0.3, respectively. With the above definitions, the following statements are made. When $\bar{y}_{T\_mapping}$ (for example, 1)>DHI>$UCL_{\_mapping}$ (for example, 0.7) (or $\bar{y}_{T\_mapping}$ (for example, 1)>DHI>$LCL_{\_mapping}$ (for example, 0.7)), the component of the production tool is healthy and normally operated; when $UCL_{\_mapping}$ (for example, 0.7)>DHI>$USL_{\_mapping}$ (for example, 0.3) (or $LCL_{\_mapping}$ (for example, 0.7)>DHI>$LSL_{\_mapping}$ (for example, 0.3)), the component of the production tool is sick and cannot work after remaining useful life (RUL) of the component of the production tool is worn out; and when $USL_{\_mapping}$ (for example, 0.3)>DHI>Max $y_{T\_mapping}$ (for example, 0) (or $LSL_{\_mapping}$ (for example, 0.3)>DHI>Min $y_{T\_mapping}$ (for example, 0)), the component of the production tool is dead and needs maintenance immediately.

Then, N values of the aging feature in the sets of process data that are obtained before the sample selection point are used as a set of model-building sample data, in which the N values of the aging feature ($y_T$) are one-to-one corresponding to N sets of the sets of process data belonging to N of the workpieces that are processed before the sample selection point, where N is a positive integer. Thereafter, a model-building operation 260 is performed to build an aging-feature prediction model by using the set of model-building sample data in accordance a time series prediction algorithm, thereby obtaining plural predicted values of the aging feature ($y_T$) that are arranged in a processing order. Then, a process time of each of the workpieces and a dead spec are used to perform a conversion operation for converting the predicted values of the aging feature ($y_T$) to plural predicted remaining useful life values ($RUL_t$), in which the dead spec is a value of the aging feature ($y_T$) used or generated by the component when the component cannot work; and t stands for the $t^{th}$ workpieces and t is an integer. The time series prediction algorithm and the model-building operation 260 will be described in detail later. In the conversion operation, at first, plural time points at which the component of the production tool processes the workpieces respectively are obtained in accordance with the process times used by the component of the production tool for processing the workpieces respectively. Thereafter, an operation is performed to sequentially determine if the predicted values are substantially equal to the dead spec until an earliest one of the predicted values is found, and one of the time points corresponding to the earliest one of the predicted values is a death time point at which the component cannot work. Then, an operation is performed to compute differences between the death time point and the respective time points at which the workpieces are processed, thereby obtaining the predicted remaining useful life values ($RUL_t$).

Thereafter, a second determination operation is performed to determine if the component of the production tool needs replacement or maintenance in accordance with the predicted remaining useful life values ($RUL_t$). In some embodiments, the second determination operation includes a pre-alarm mode 270 and a DCI model 280. The pre-alarm mode 270 and a DCI model 280 will be described later.

The time series prediction algorithm adopted in embodiments of the disclosure may be an autoregressive integrated moving (ARIMA) model, but the embodiments of the disclosure are not limited thereto. The ARIMA model includes a moving average (MA) model and an autoregressive (AR) model. Although the time series prediction algorithm can predict the future trend based on historical data, the optimal combination of the MA model and the AR model used for model creation is still unclear. In addition, the aging feature of the component of the production tool is degrading and not stationary. However, the time series analysis can only conduct the prediction under the condition of weak stationarity. Embodiments of the disclosure provoke the model-building operation 260 to overcome the difficulties.

Figure 3A:
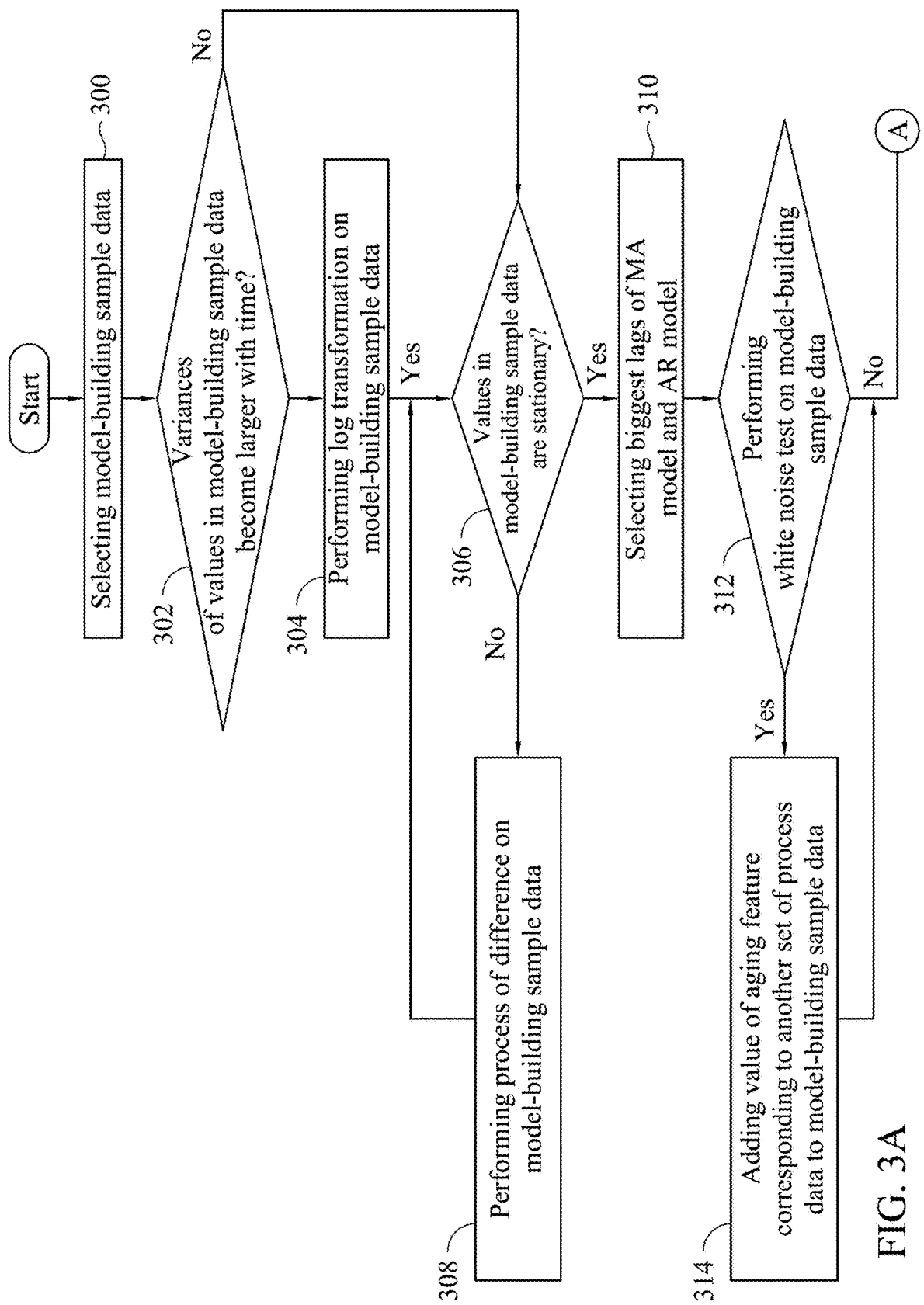
FIG. 3A and FIG. 3B are a flow chart showing a model-building operation according to some embodiments of the disclosure.
Figure 3B:
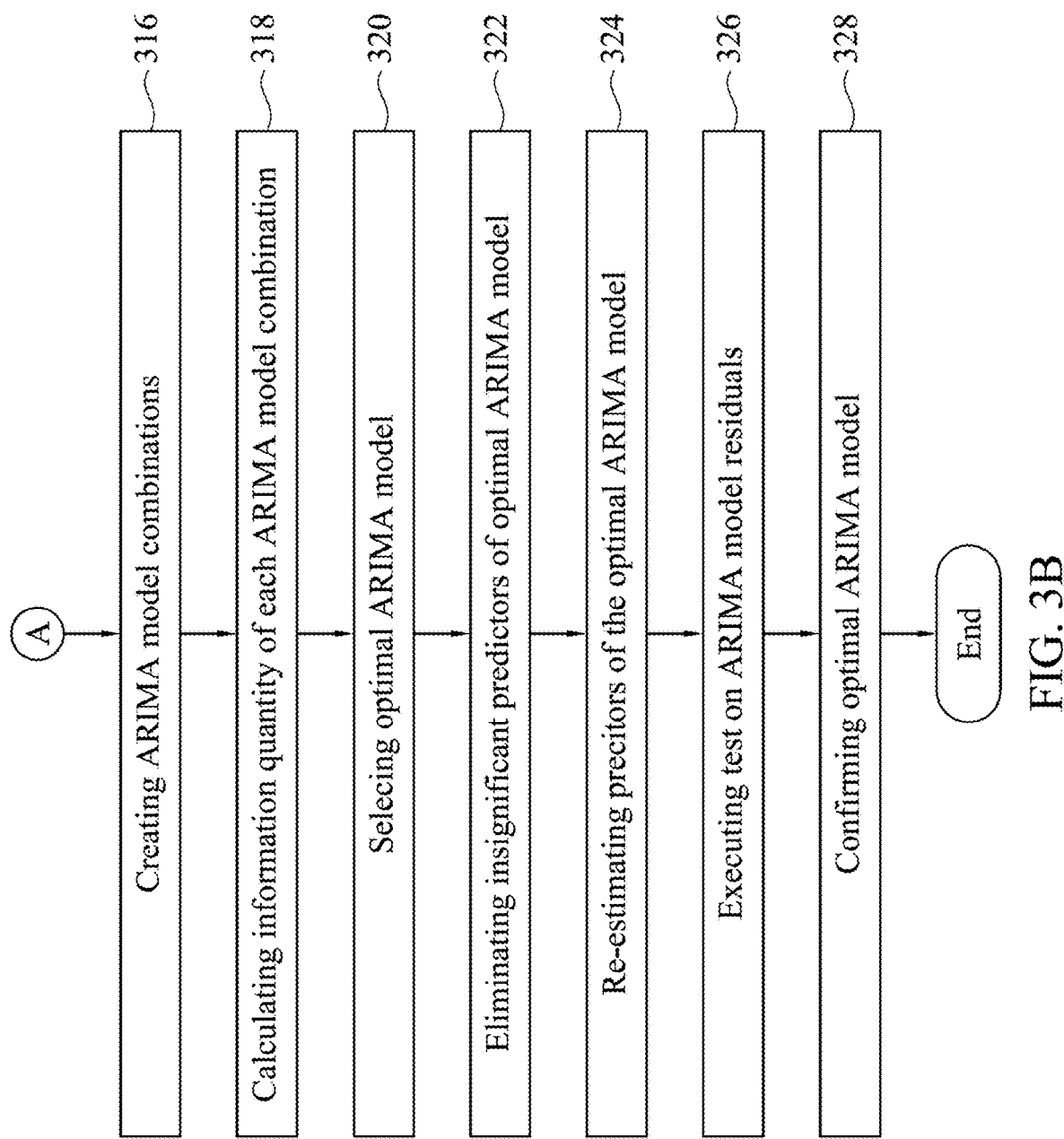

Referring to FIG. 3A and FIG. 3B, FIG. 3A and FIG. 3B are a flow chart showing a model-building operation according to some embodiments of the disclosure. At first, step 300 is performed to select a value of the aging feature (actual aging feature value) in each of N sets of the process data corresponding to N workpieces processed by the component of the production tool before the aforementioned sample selection point (t) (i.e. the first workpiece with the DHI is greater than 0.7) as a set of model-building sample data, where N is a positive integer, such as 30, i.e. 30 workpieces before the workpiece with DHI greater than 0.7, and the set of model-building sample data $Y_M = \{y_{t-30}, y_{t-29}, \ldots, y_{t-2}, y_{t-1}\}$.

Thereafter, step 302 is performed to determine the variances of the values in the set of model-building sample data become larger with time (time points processing the workpieces). In other words, if $y_t=(1+\alpha)\times y_{t-1}$, in which $\alpha$ is greater than 0, meaning that $y_t$ increases over time and $Var(y_t)$ grows along with $\alpha$, then step 304 is performed; else step 306 is performed. In step 304, Log transformation is performed on each value in the set of model-building sample data, thereby forcing the increase rate distribution of data to possess certain regularity, and then step 306 is performed.

In step 306, a unit root test is performed on the values in the set of model-building sample data, thereby checking whether the values in the set of model-building sample data are stationary or not. When the values in the set of model-building sample data are not stationary, a process of difference (difference operator) is performed on each value in the set of model-building sample data (step 308), such that non-stationary series can be converted into stationary ones through the process of difference. The process of difference is formulated as $\nabla^d y_{t-i} = y_{t-i} - y_{t-i-1}$. When the values arranged in series are stationary (the result of step 306 is true ("yes")), step 310 is performed to use an autocorrelation function (ACF) to select the biggest lag of the MA model, and use an partial autocorrelation function (PACF) to select the biggest lag of the AR model, and the formulas are listed as follows:

$$A = \mathrm{argmax}(\rho_k) \quad (1)$$

$$B = \mathrm{argmax}(\rho\rho_k). \quad (2)$$

$$\rho_k = \frac{\mathrm{cov}(y_t, y_{t-k})}{\sqrt{\mathrm{Var}(y_t)}\sqrt{\mathrm{Var}(y_{t-k})}} = \frac{\gamma_k}{\gamma_0} \quad (3)$$

$$\rho\rho_k = \mathrm{Corr}(y_t, y_{t-k} \mid y_{t-1}, y_{t-2}, y_{t-k+1}) \quad (3')$$

$$\gamma_k = \mathrm{cov}(y_t, y_{t-k}) = E(y_t - \mu)(y_{t-k} - \mu) \quad (4)$$

where A is the most $y_{t-1}$-related ACF time (workpiece number) and B is the most $y_{t-1}$-related PACF time (workpiece number); $Var(y_t) = Var(y_{t+k}) = E(y_t - \mu)^2 = \gamma_0$; $E[\cdot]$ is the expected value; $\mu$ is the mean of $y_t$.

TABLE 2

| | | T | T-1 | T-2 | T-3 | T-4 | T-5 |
|---|---|---|---|---|---|---|---|
| AR | PACF | 1 | 0.53687 | 0.09422 | 0.1404 | -0.2021 | 0.00972 |
| MA | ACF | 1 | 0.53685 | 0.31392 | 0.21867 | -0.0591 | -0.0174 |

| | | T-6 | T-7 | T-8 | T-9 | T-10 | T11 |
|---|---|---|---|---|---|---|---|
| AR | PACF | -0.0764 | -0.1592 | 0.31568 | -0.4049 | -0.2597 | -0.0253 |
| MA | ACF | -0.0315 | -0.1721 | -0.0616 | -0.2361 | -0.3736 | -0.1574 |

As shown in Table 2, PACF starts to decrease after $y_{T-9}$, ACF starts to decrease after $y_{T-10}$, and thus A=10, B=9.

Thereafter, step 312 is performed to perform a white noise test on the respective values in the set of model-building sample data $(Y_M)$, in which the white noise test may be a Ljung-Box test. Step 312 is mainly to check if the time series data is white noise, i.e. autocorrelation between any two values in the set of sample data is 0 meaning that the two values are irrelevant. If any value in the set of model-building sample data is white noise, a value of the aging feature corresponding to another set of the sets of process data belonging to the N+1$^{th}$ workpiece that is processed before the sample selection point is added to the set of model-building sample data (step 314), i.e. $y_{t-(N+1)}$ or $y_{t-31}$.

Then, step 316 is performed to create plural ARIMA model combinations by using the biggest lag of the MA model and the biggest lag of the AR model. For example, 10*9 ARIMA model combinations are created: ARIMA(1, d, 1), ARIMA(1, d, 2), ..., ARIMA(9, d, 10). Hereinafter, the AR model, the MA model and the ARIMA model are described.

The AR(p) model is defined as:

$$\hat{y}_t = \sum_{i=1}^{P} \varphi_i y_{t-i} \quad (5)$$

$$\varepsilon_t = y_t - \hat{y}_t = y_t - (\sum_{i=1}^{P} \varphi_i y_{t-i}) \quad (6)$$

where $y_t$ is an actual value of the aging feature at a time point t (the $t^{th}$ workpiece); $\hat{y}_t$ is a predicted value of the aging feature at a time point t (the $t^{th}$ workpiece); $\varphi_i$ is the least square estimated coefficient of the autoregressive model, i=1, 2, ..., p; $y_{t-i}$ is an actual value of the aging feature at a time point (t-i) (the (t-i)$^{th}$ workpiece); $\varepsilon_t$ is a white noise term at a time point t (the $t^{th}$ workpiece).

The MR(q) model is defined as:

$$\hat{y}_t = \sum_{j=1}^{q} \theta_j \varepsilon_{t-j} \quad (7)$$

where $\theta_j$ is the least square estimated coefficient of the moving average model, j=1, 2, ..., q; $\varepsilon_{t-j}$ is a white noise term at a time point (t-i) (the (t-i)$^{th}$ workpiece).

The ARMA (p, q) model constitutes of the AR(p) model and the MA(q) model. The ARMA (p, q) model contains p autoregressive (AR) operators and q moving average (MA) operators, and the enhanced ARMA model becomes ARIMA (p, d, q) model. The ARIMA is different from the ARMA model as the ARIMA model only conducts the ARMR model creation after executing d$^{th}$ difference on data till it is back to the stationary. The ARMA (p, q) model can be expressed as:

$$\hat{y}_t = \sum_{i=1}^{P} \varphi_i y_{t-i} + \sum_{j=1}^{q} \theta_j \varepsilon_{t-j}. \quad (8)$$

Assuming that it is desired to predict a value of the aging feature at the time point (t+n) when the component of the production tool is at the time point t, a predicted is introduced into equation (8) instead of the actual value to perform prediction, and the equation (8) becomes:

$$\hat{y}_{t+n} = \sum_{i=1}^{p} \varphi_i y_{t-i} + \sum_{i=t+1}^{t+n-1} \varphi_i \hat{y}_i + \sum_{j=1}^{q} \theta_j \varepsilon_{t-J} + \sum_{j=t+1}^{t+n-1} \theta_j \hat{y}_j. \quad (9)$$

Then, step 318 is performed to calculate an information quantity of each of the ARIMA model combinations by using an information criterion algorithm, in which the information criterion algorithm is a Bayesian information criterion (BIC) or an Asaike information criterion (AIC). In statistics, BIC is a criterion for model selection among a finite set of models; thus, the model with the lowest BIC is preferred. The BIC algorithm is expressed as:

$$BIC(p+q) = \log\left(\frac{SSE(p+q)}{M}\right) + (p+q+1)\frac{\log(M)}{M} \quad (10)$$

$$SSE(p+q) = \sum_{i=1}^{M} (y_i - \hat{y}_i)^2 \quad (11)$$

where SSE is sum of squared errors; and M is the size of the set of model-building sample data.

Table 3 is an example of the information quantity of each of the ARIMA model combinations ARIMA(1, d, 1), ARIMA(1, d, 2), . . . , ARIMA(9, d, 10) calculated by using the BIC algorithm.

TABLE 3

|    |   | AR |    |    |
|----|---|----|----|----|
|    |   | 0  | 1  | 2  |
| MA | 0 | −218.30939 | −215.54911 | −220.2646 |
|    | 1 | −221.13701 | −228.94441 | −230.1580 |
|    | 2 | −212.29567 | −208.90225 | −229.4545 |
|    | 3 | −217.29241 | −224.24721 | −228.4545 |
|    | 4 | −214.18086 | −221.9657 | −229.8424 |
|    | 5 | −212.14508 | −224.49752 | −229.4548 |
|    | 6 | −206.41807 | −221.16829 | −228.0000 |
|    | 7 | −207.85106 | −213.91059 | −229.4548 |
|    | 8 | −218.31398 | −215.49583 | −217.2924108 |

Thereafter, step 320 is performed to select one of the ARIMA model combinations that has the biggest information quantity as an optimal model, for example, ARIMA(2, 0, 1).

Then, step 322 is performed to eliminate the insignificant predictors (parameters) of the optimal ARIMA model. When an estimated coefficient of a predictor is over 95% confidence interval, the predicator is an insignificant predictor. With assumption of normal distribution, 95% confidence interval equals to 1.96, which means that the predictor cannot be utilized to explain the future spans, and thus will be deleted. The determination formulas for the insignificant predictors (parameters) of the optimal model are listed as follows:

$$|\varphi_i| > 1.96 \times s.e.(\varphi_i) \tag{12}$$

$$|\theta_j| > 1.96 \times s.e.(\theta_j). \tag{13}$$

According to the above example, as shown in Table 4, MA(1) is an insignificant parameter, and thus is eliminated.

TABLE 4

| Parameter | Value | s.e. |
|-----------|-------|------|
| AR(1) | 1.226 | 0.7669 |
| AR(2) | −0.577 | 0.3224 |
| MA(1) | −0.1343 | 0.0423 |

Thereafter, step 324 is performed to re-estimate the coefficients of the predictors of the optimal ARIMA model after removing the insignificant predictors. According to the above example, the re-estimated model is ARIMA(2, 0,0), i.e. $\hat{y}_t = 1.7783 y_{t-1} - 0.7783 y_{t-2}$.

Then, step 326 is performed to execute a test on the (ARIMA) model residuals, and the test may be a Ljung-Box test, etc., for example. When the model residuals are explanatory, the re-estimated model is confirmed as the optimal (ARIMA) model (step 328), and is used to obtain plural predicted values of the aging feature ($y_T$) that are arranged in a processing order of the workpieces. Thereafter, step 330 is performed to use a process time (dt) and a dead spec to convert the predicted values of the aging feature to predicted remaining useful life values ($RUL_t$), in which the process time (dt) is a period of time used by the component of the production tool for processing each of the workpieces, and the dead spec is a value of the aging feature ($y_T$) used or generated by the component of the production tool when the component of the production tool cannot work. The conversion is formula is $RUL_t = k_D - k_t$, where t represents the $t^{th}$ workpiece and is an integer; $k_t$ represents the $t^{th}$ workpiece; $k_D$ represents the time point of the earliest one of the predicted values corresponding to the dead spec.

After the predicted remaining useful life values ($RUL_t$) are obtained, a second determination operation is performed to determine if the component of the production tool needs replacement or maintenance in accordance with the predicted values of the aging feature or the predicted remaining useful life values ($RUL_t$). As shown in FIG. 2A, in some embodiments, the second determination operation includes the pre-alarm mode 270 and the DCI mode 280.

Hereinafter, the pre-alarm mode 270 is explained. When the predicted remaining useful life values ($RUL_t$) decline dramatically or oscillates near the dead state, it is difficult for a used to determine if the component of the production tool needs replacement or maintenance. Thus, the pre-alarm mode 270 is provided to solve the problem. Referring to FIG. 4, FIG. 4 is schematic block diagram for explaining a pre-alarm mode according to some embodiments of the disclosure. At first, at level 1, step 400 is performed to determine if the decline rate of the current $RUL_t$ compared to the previous $RUL_{t-1}$ is greater than or equal to a threshold (for example, 30%), i.e. if $(RUL_{t-1} - RUL_t)/RUL_{t-1} \geq 0.3$ is met. When the result of step is true ("yes"), step 410 or 420 at level 2 is performed to determine if $RUL_t$ is smaller than a maintenance buffer time (BT), thereby obtaining a second result, in which the maintenance buffer time (BT) is provided by a manufacturer of the component of the production tool, and the component of the production tool has to be maintained or replaced within the maintenance buffer time (BT) when being abnormal. When the first result and the second result both are false ("no"), the component of the production tool is in a sick state but does not deteriorate drastically, and no maintenance is needed, such that a green light is shown, for example. When the first result is false ("no") and the second result is true ("yes"), the component of the production tool does not deteriorate drastically but its remaining useful life is sufficient, and maintenance is needed, such that a blue light is shown, for example. When the first result is true ("yes") and the second result is false ("no"), the component of the production tool deteriorates drastically, such that a brown light is shown, for example. If the first result for each of the $t^{th}$ workpiece to the $(t+p)^{th}$ workpiece that are successively processed by the component of the production tool is true ("yes") and its corresponding second result is false ("no"), i.e. those p workpieces show brown light, then inspection or maintenance is needed, where p is a positive integer. When the first result and the second result both are true ("yes"), the component of the production tool needs maintenance, such that a red light is shown, for example.

Hereinafter, the DCI mode 280 is explained. To handle the case in the pre-alarm mode 270 in which the blue light is shown presently but the component of the production tool suddenly dies (does not work) at a time point when processing a next workpiece, the DCI mode 280 is provided. The DCI is used to estimate the correlation between $y_{death}$ and $y_{t-1}$, in which $y_{death}$ is the predicted value of the aging feature corresponding to a time point when the component of the production tool is at a dead state, and $y_{t-1}$ is the predicted value of the aging feature corresponding to the $(t-1)^{th}$ workpiece processed by the component of the production tool. The DCI is defined from 0 to 1, and the higher value of the DCI indicates the sicker of the component of the production tool. When the value of DCI is higher than its threshold ($DCI_T$), under 95% confidence level, there is a positive correlation between the current status of the component of production tool and its predicted RUL, which means that the component of the production tool is closer to the dead state, and it requires immediate maintenance. On the contrary, when the calculated DCI is closer to 0, it means the current status of the component of the production tool is irrelevant with its predicted RUL. In other words, even if the component of the production tool is sick, it is not in danger of entering the dead state. According to ACF as in equation (3), DCI can be calculated as:

$$DCI_t = \frac{conv(y_{death}, y_{t-1})}{Var(y_{death})} \quad (14)$$

The threshold ($DCI_T$) is defined as $$DCI_T = 1.96 \times s.e.(DCI) \quad (15)$$

where s.e. (DCI) is a standard error of the DCI, conv is the covariance computation, and Var is the variance computation.

Figure 5A:
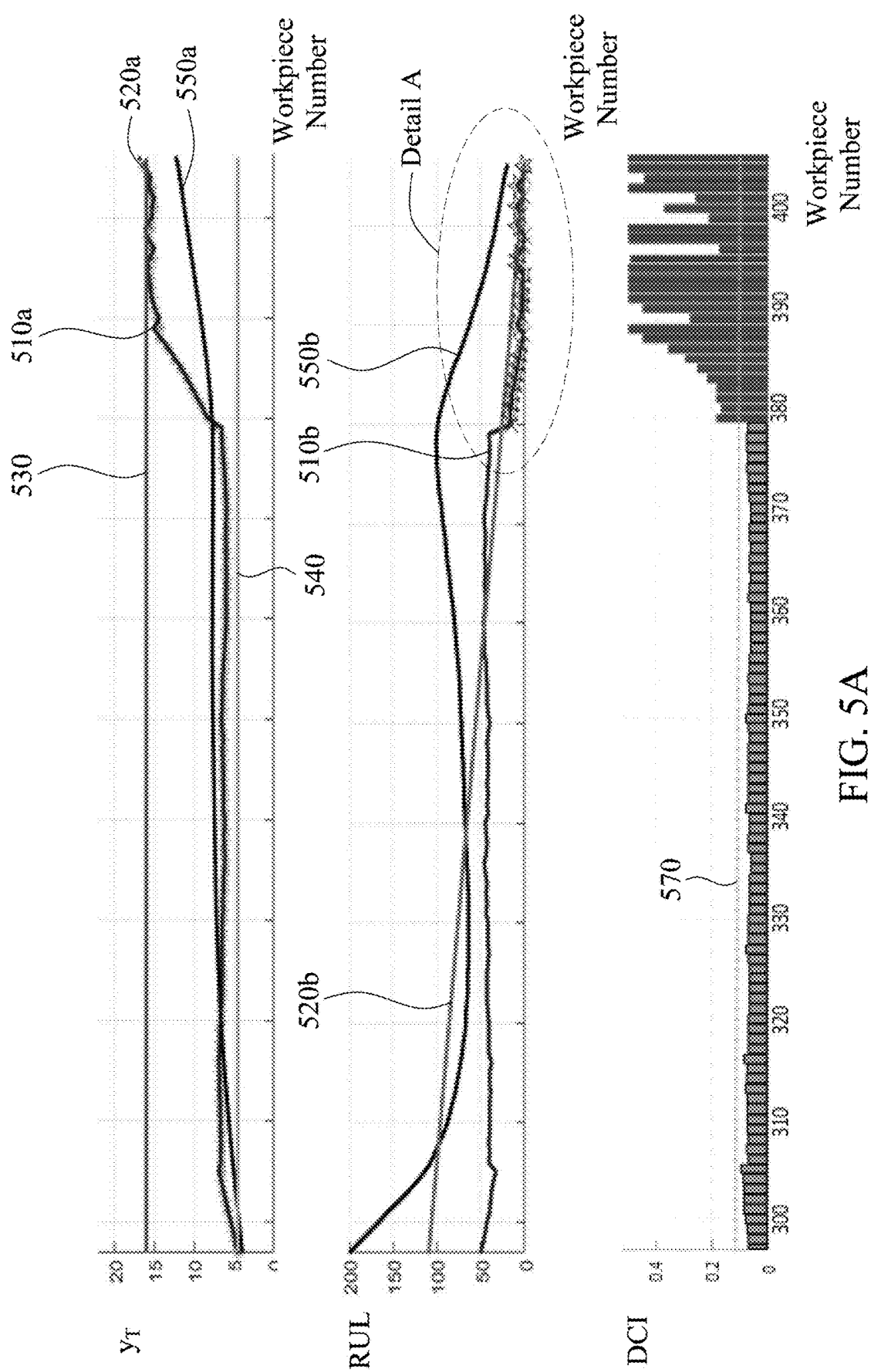
FIG. 5A and FIG. 5B are prediction results of an application example of the disclosure.
Figure 5B:
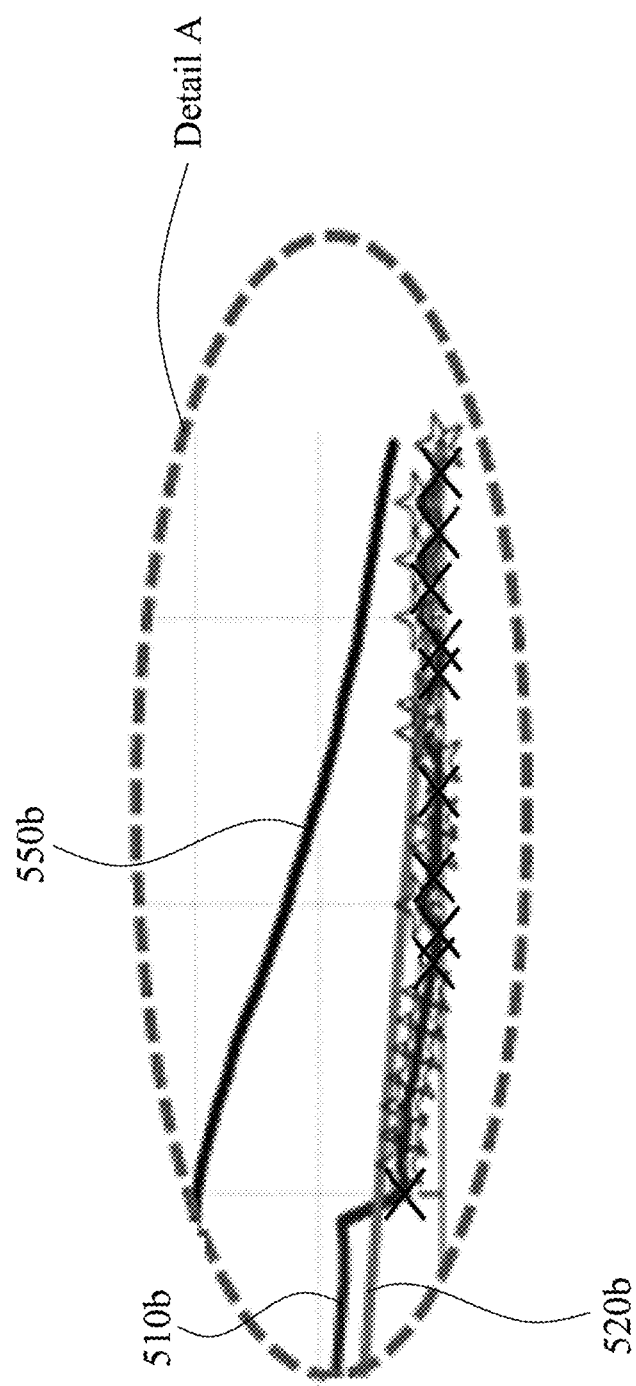

Hereinafter, an average valve opening (aging feature) of a throttle valve of a PECVD tool and its RUL prediction results are used to explain the embodiments of the disclosure. Referring to FIG. 5A and FIG. 5B, FIG. 5A and FIG. 5B are prediction results of an application example of the disclosure. The upper part of FIG. 5A shows the prediction results of the average valve opening angle (aging feature) of the throttle valve, in which a curve 510a shows predicted values of the average valve opening angle (aging feature) of the throttle value by using the application example of the disclosure; a curve 520a (composed of "*" signs) shows actual values of the average valve opening angle (aging feature) of the throttle value; a line 530 shows a dead spec of the average valve opening angle (aging feature) of the throttle value; a line 540 shows a sick spec of the average valve opening angle (aging feature) of the throttle value; and a curve 550a shows predicted values of the average valve opening angle (aging feature) of the throttle value by using a typical exponential model. The middle part of FIG. 5A shows the prediction results of the RUL of the throttle valve, in which a curve 510b shows predicted values of the RUL of the throttle value by using the application example of the disclosure; a curve 520b shows actual values of the RUL of the throttle value; and a curve 550b shows predicted values of the RUL of the throttle value by using a typical exponential model. The lower part of FIG. 5A shows the prediction results of the DCI of the throttle valve, in which a line 570 shows a DCI threshold ($DCI_T$). Before the $380^{th}$ workpiece is processed by the throttle valve, the DCI of the throttle valve is good and no maintenance is needed. After the $380^{th}$ workpiece is processed by the throttle valve, the DCI of the throttle valve is greater than the DCI threshold ($DCI_T$), meaning that the throttle is close to the dead state after processing the $380^{th}$ workpiece.

As shown in the middle part of FIG. 5A, when the throttle valve processes the $330^{th}$ to $370^{th}$ workpieces, the curve 520b (actual values of RUL) is quite stable, the curve 550b (predicted values of RUL by the exponential model) has a rising trend and is deviated from the curve 520b (actual values of RUL), and the curve 510b (predicted values of RUL by the application of the disclosure) is quite close to the curve 520b (actual values of RUL) without a rising trend. Thus, embodiments of the disclosure can overcome the shortcomings of the exponential model.

As shown in the middle part of FIG. 5A and FIG. 5B, in which "☆" stands for the blue light of the pre-alarm mode, and "X" stands for the red light of the pre-alarm mode. After the throttle valve processes the $379^{th}$ workpiece, the curve 520a (actual values of aging feature) rises abruptly. Although the curve 520 does not follow up with the curve 520b immediately, yet the curve 520 catch up with the curve 520b after the throttle value processes the $380^{th}$ workpiece and a red light is shown (its decline rate is greater than 30% and $RUL_{380}$ is greater than the maintenance buffer time (BT). As shown by the curve 520b (actual values of RUL), after the throttle value processes the $380^{th}$ workpiece, the throttle valve is dead, and thus the display of red right is correct.

Before the throttle value processes the $380^{th}$ workpiece, the pre-alarm mode shows green lights, meaning that the component of the production tool is sick but does not deteriorate rapidly, and thus no maintenance is needed. After the throttle value processes the $380^{th}$ workpiece, the pre-alarm mode shows red lights, meaning that the component of the production tool needs maintenance.

It is understood that the method for identifying root causes of a yield loss is performed by the aforementioned steps. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in semiconductor fabrication, the present disclosure is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws. The manufacturing system includes one or more processing tools that may be used to form one or more products, or portions thereof, in or on the workpieces (such as wafers, glass substrates). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

It can be known from the above that, the application of the embodiments of the present invention can accurately predict the RUL of the component of the production tool in real time, so as to perform maintenance on the component of the production tool in time; and can perform maintenance immediately when the component is very likely to enter a dead state, and can quantitatively show the possibility of the component entering the dead state.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A predictive maintenance method, comprising:

obtaining a plurality of sets of process data used or generated by a component of a production tool when a plurality of workpieces are processed in sequence, wherein each of the sets of process data comprises values of a plurality of parameters, the values of each of parameters in each of the sets of process data is a set of time series data values within a period of processing time when the component of the production tool is processing one of the workpieces, and the sets of process data are one-to-one corresponding to the sets of workpieces;

according to if an abnormal event occurs when the component is processing each of the workpieces, obtaining a plurality of event indicative values that are one-to-one corresponding to the sets of process data;

converting the set of time series data values of each of the parameters in each of the sets of process data to a value of a parameter indicator by using a plurality of algorithms respectively, wherein the parameter indicators are one-to-one corresponding to the parameters;

conducting a correlation analysis between each of parameter indicators and the event indicative values, thereby obtaining a plurality of correlation coefficients one-to-one corresponding to the parameter indicators;

selecting one of the parameter indicators that is corresponding to a maximum one of the correlation coefficients as an aging feature ($y_T$);

performing a first determination operation to determine if the component is in a sick state according to the value of the aging feature ($y_T$) corresponding to each of the workpieces, wherein one of the workpieces is set as a sample selection point once the component is in the sick state when processing the one of the workpieces;

using N values of the aging feature as a set of model-building sample data, wherein the N values of the aging feature ($y_T$) are corresponding to N sets of the sets of process data belonging to successive N of the workpieces that are processed directly before the sample selection point, wherein N is a positive integer;

performing a model-building operation to build an aging-feature prediction model by using the set of model-building sample data in accordance a time series prediction algorithm, thereby obtaining a plurality of predicted values of the aging feature ($y_T$) that are arranged in a processing order;

obtaining a plurality of time points at which the component processes the workpieces respectively in accordance with a plurality of process times used by the component for processing the wokpieces respectively;

obtaining a dead spec that is a value of the aging feature ($y_T$) used or generated by the component when the component cannot work;

sequentially determining if the predicted values are substantially equal to the dead spec until an earliest one of the predicted values is found, wherein one of the time points corresponding to the earliest one is a death time point at which the component cannot work; and computing differences between the death time point and the respective time points at which the workpieces are processed, thereby obtaining a plurality of predicted remaining useful life values ($RUL_t$), wherein t stands for the $t^{th}$ workpieces and t is an integer, wherein the model-building operation comprises:

building the aging-feature prediction model by using an autoregressive integrated moving average (ARIMA) model as the time series prediction algorithm, wherein the ARIMA model comprising a moving average (MA) model and an autoregressive (AR) model;

selecting the biggest lag of the MA model by using an autocorrelation function (ACF), and selecting the biggest lag of the AR model by using a Partial autocorrelation function (PACF);

performing a white noise test on the values of the aging feature in the set of model-building sample data, wherein when one of the values of the aging feature in the set of model-building sample data is a white noise, a value of the aging feature corresponding to another set of process data belonging to a $(N+1)^{th}$ workpiece processed before the selection sample point is added to the set of model-building data;

creating a plurality of ARIMA model combinations by using the biggest lag of the MA model and the biggest lag of the AR model;

calculating an information quantity of each of the ARIMA model combinations by using an information criterion algorithm; and selecting one of the ARIMA model combinations that has the biggest information quantity as an optimal model.

2. The predictive maintenance method as claimed in claim 1, wherein the first determination operation comprises:

converting the values of the aging feature ($y_T$) in each of the sets of process data to a plurality of device health indices (DHI) in accordance with a set of conversion formulas as follows:

when $\bar{y}_T < y_T < UCL$, $$DHI = \bar{y}_{T\_mapping} - \left(\frac{y_T - \bar{y}_T}{UCL - \bar{y}_T} \times (\bar{y}_{T\_mapping} - UCL_{\_mapping})\right);$$

when $UCL < y_T < USL$, $$DHI = UCL_{\_mapping} - \left(\frac{y_T - UCL}{USL - UCL} \times (UCL_{\_mapping} - USL_{\_mapping})\right);$$

when $USL < y_T < \text{Max } y_T$, $$DHI = USL_{\_mapping} - \left(\frac{y_T - UCL}{USL - USL} \times (USL_{\_mapping} - \text{Max} y_{T\_mapping})\right);$$

when $LCL < y_T < \bar{y}_T$, $$DHI = \bar{y}_{T\_mapping} - \left(\frac{y_T - USL}{\text{Max } y_T - USL} \times (\bar{y}_{T\_mapping} - LCL_{\_mapping})\right);$$

-continued when $LSL < y_T < LCL$, $$DHI = LCL\_mapping - \left(\frac{LCL - y_T}{LCL - LSL} \times (LCL\_mapping - LSL\_mapping)\right);$$

when $\text{Min } y_T <_T < LSL$, $$DHI = LSL\_mapping - \left(\frac{LSL - y_T}{LSL - \text{Min} y_T} \times (\text{Min} y_{T\_mapping} - LSL\_mapping)\right);$$

wherein $\bar{y}_T$ represents the mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $Y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; $LCL_{\_mapping}$ is a conversion value corresponding to the LCL; $USL_{mapping}$ is a conversion value corresponding to the USL; and $UCL_{\_mapping}$ is a conversion value corresponding to the UCL; and sequentially determining if the device health indices are greater or equal to a threshold value until an earliest one of the device health indices is found, wherein one of the workpieces corresponding to the earliest one of the device health indices is set as the sample selection point.

3. The predictive maintenance method as claimed in claim 1, wherein the information criterion algorithm is a Bayesian information criterion (BIC) or an Akaike information criterion (AIC).

4. The predictive maintenance method as claimed in claim 1, wherein the model-building operation comprises:
determining if variances of the values of the aging feature in the set of model-building sample data become larger with time, and performing a log transformation on each of the values of the aging feature in the set of model-building sample data when the variances of the values of the aging feature in the set of model-building sample data become larger with time;
performing a unit root test on the values of the aging feature in the set of model-building sample data to check if the values of the aging feature in the set of model-building sample data arranged in sequence is stationary, and performing a process of difference on each of the values of the aging feature in the set of model-building sample data when the values of the aging feature in the set of model-building sample data is not stationary.

5. The predictive maintenance method as claimed in claim 4, wherein the unit root test is an augmented Dickey-Fuller test (ADF test) or a Kwiatkowski-Phillips-Schmidt-Shin (KPSS) test.

6. The predictive maintenance method as claimed in claim 1, further comprising performing a second determination operation to determine if the component of the production tool needs replacement or maintenance, wherein the second determination operation comprises:
determining if $(RUL_t - RUL_{t-1})/RUL_{t-1}$ is greater than or equal to a threshold, thereby obtaining a first result, wherein t−1 stands for the $(t-1)^{th}$ workpiece;
determining if $RUL_t$ is smaller than a maintenance buffer time, thereby obtaining a second result, wherein the component of the production tool has to be maintained within the maintenance buffer time when being abnormal; wherein
when the first result and the second result both are false, the component of the production tool is in a sick state but does not deteriorate drastically, and no maintenance is needed;
when the first result is false and the second result is true, the component of the production tool does not deteriorate drastically but its remaining useful life is sufficient, and maintenance is needed;
when the first result is true and the second result is false, the component of the production tool deteriorates drastically, and if the first result for each of the $t^{th}$ workpiece to the $(t+p)^{th}$ workpiece that are successively processed by the component of the production tool is true and the second result for the for each of the $t^{th}$ workpiece to the $(t+p)^{th}$ workpiece is false, inspection or maintenance is needed, wherein p is a positive integer; and
when the first result and the second result both are true, the component of the production tool needs maintenance.

7. The predictive maintenance method as claimed in claim 1, further comprising performing a second determination operation to determine if the component of the production tool needs replacement or maintenance, wherein the second determination operation comprises:
converting the predicted values of the aging feature ($y_T$) to a plurality of death correlation indices (DCI) in accordance with a set of conversion formulas as follows:

$$DCI_t = \frac{conv(y_{death}, y_{t-1})}{\text{Var}(y_{death})},$$

wherein $y_{death}$ is the $y_{death}$ is the predicted value of the aging feature when the component cannot work, $y_{t-1}$ is the value of the aging feature corresponding to the $(t-1)^{th}$ workpiece processed by the component, conv is the covariance computation, and Var is the variance computation; and when $DCI_t$ is greater than a threshold, it means that the component is near a dead state when processimg the $t^{th}$ workpiece, wherein the threshold is based on a standard error of $DCI_t$.

8. The predictive maintenance method as claimed in claim 1, wherein the component comprises a heater, a pressure module, a throttle valve, an oilless bushing or a bearing, and the parameters comprise a valve opening angle, a vibration amplitude, a driving voltage, a driving current, a temperature and/or a pressure.

9. The predictive maintenance method as claimed in claim 1, wherein the parameter indicators comprise a k-times frequency feature (where k is greater than 0) after conversion to a frequency domain, a global similarity index (GSI), a kurtosis of statistic distribution, a skewness of statistic distribution, a standard deviation, a root mean square (RMS), a mean value, a maximum value, and/or a minimum value.

10. A non-transitory tangible computer readable recording medium storing instructions which when executed by a processor configured to perform a predictive maintenance method, the predictive maintenance method comprising:
obtaining a plurality of sets of process data used or generated by a component of a production tool when a plurality of workpieces are processed in sequence, wherein each of the sets of process data comprises values of a plurality of parameters, the values of each of parameters in each of the sets of process data is a set of time series data values within a period of processing time when the component of the production tool is processing one of the workpieces, and the sets of process data are one-to-one corresponding to the sets of workpieces;

according to if an abnormal event occurs when the component is processing each of the workpieces, obtaining a plurality of event indicative values that are one-to-one corresponding to the sets of process data;

converting the set of time series data values of each of the parameters in each of the sets of process data to a value of a parameter indicator by using a plurality of algorithms respectively, wherein the parameter indicators are one-to-one corresponding to the parameters;

conducting a correlation analysis between each of parameter indicators and the event indicative values, thereby obtaining a plurality of correlation coefficients one-to-one corresponding to the parameter indicators;

selecting one of the parameter indicators that is corresponding to a maximum one of the correlation coefficients as an aging feature ($y_T$);

performing a first determination operation to determine if the component is in a sick state according to the value of the aging feature ($y_T$) corresponding to each of the workpieces, wherein one of the workpieces is set as a sample selection point once the component is in the sick state when processing the one of the workpieces;

using N values of the aging feature as a set of model-building sample data, wherein the N values of the aging feature ($y_T$) are corresponding to N sets of the sets of process data belonging to successive N of the workpieces that are processed directly before the sample selection point, wherein N is a positive integer;

performing a model-building operation to build an aging-feature prediction model by using the set of model-building sample data in accordance a time series prediction algorithm, thereby obtaining a plurality of predicted values of the aging feature ($y_T$) that are arranged in a processing order;

obtaining a plurality of time points at which the component processes the workpieces respectively in accordance with a plurality of process times used by the component for processing the wokpieces respectively;

obtaining a dead spec that is a value of the aging feature ($y_T$) used or generated by the component when the component cannot work;

sequentially determining if the predicted values are substantially equal to the dead spec until an earliest one of the predicted values is found, wherein one of the time points corresponding to the earliest one is a death time point at which the component cannot work; and computing differences between the death time point and the respective time points at which the workpieces are processed, thereby obtaining a plurality of predicted remaining useful life values ($RUL_t$), wherein t stands for the $t^{th}$ workpieces and t is an integer, wherein the model-building operation comprises:
building the aging-feature prediction model by using an autoregressive integrated moving average (ARIMA) model as the time series prediction algorithm, wherein the ARIMA model comprising a moving average (MA) model and an autoregressive (AR) model;

selecting the biggest lag of the MA model by using an autocorrelation function (ACF), and selecting the biggest lag of the AR model by using a partial autocorrelation function (PACF);

performing a white noise test on the values of the aging feature in the set of model-building sample data, wherein when one of the values of the aging feature in the set of model-building sample data is a white noise, a value of the aging feature corresponding to another set of process data belonging to a $(N+1)^{th}$ workpiece processed before the selection sample point is added to the set of model-building data;

creating a plurality of ARIMA model combinations by using the biggest lag of the MA model and the biggest lag of the AR model;

calculating an information quantity of each of the ARIMA model combinations by using an information criterion algorithm; and selecting one of the ARIMA model combinations that has the biggest information quantity as an optimal model.

11. The non-transitory tangible computer readable recording medium as claimed in claim 10, wherein the first determination operation comprises:
converting the values of the aging feature ($y_T$) in each of the sets of process data to a plurality of device health indices (DHI) in accordance with a set of conversion formulas as follows:

when $\bar{y}_T < y_T < UCL$, $$DHI = \bar{y}_{T\_mapping} - \left(\frac{y_T - \bar{y}_T}{UCL - \bar{y}_T} \times (\bar{y}_{T\_mapping} - UCL_{\_mapping})\right);$$

when $UCL < y_T < USL$, $$DHI = UCL_{\_mapping} - \left(\frac{y_T - UCL}{USL - UCL} \times (UCL_{\_mapping} - USL_{\_mapping})\right);$$

when $USL < y_T < \text{Max } y_T$, $$DHI = USL_{\_mapping} - \left(\frac{y_T - UCL}{USL - USL} \times (USL_{\_mapping} - \text{Max}y_{T\_mapping})\right);$$

when $LCL < y_T < \bar{y}_T$, $$DHI = \bar{y}_{T\_mapping} - \left(\frac{y_T - USL}{\text{Max } y_T - USL} \times (\bar{y}_{T\_mapping} - LCL_{\_mapping})\right);$$

when $LSL < y_T < LCL$, $$DHI = LCL_{\_mapping} - \left(\frac{LCL - y_T}{LCL - LSL} \times (LCL_{\_mapping} - LSL_{\_mapping})\right);$$

when $\text{Min } y_T <_T < LSL$, $$DHI = LSL_{\_mapping} - \left(\frac{LSL - y_T}{LSL - \text{Min} y_T} \times (\text{Min} y_{T\_mapping} - LSL_{\_mapping})\right);$$

wherein $\bar{y}_T$ represents the mean of the values of the aging feature, and $\bar{y}_{T\_mapping}$ is a conversion value corresponding to $\bar{y}_T$;

Max $y_T$ represents the maximum one of the values of the aging feature, and Max $y_{T\_mapping}$ is a conversion value corresponding to Max $y_T$;

Min $y_T$ represents the minimum one of the values of the aging feature, and Min $Y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; $LCL_{\_mapping}$ is a conversion value corresponding to the LCL; $USL_{\_mapping}$ is a conversion value corresponding to the USL; and $UCL_{\_mapping}$ is a conversion value corresponding to the UCL; and sequentially determining if the device health indices are greater or equal to a threshold value until an earliest one of the device health indices is found, wherein one of the workpieces corresponding to the earliest one of the device health indices is set as the sample selection point.

12. The non-transitory tangible computer readable recording medium as claimed in claim 11, wherein the information criterion algorithm is a Bayesian information criterion (BIC) or an Akaike information criterion (AIC).

13. The non-transitory tangible computer readable recording medium as claimed in claim 10, wherein the model-building operation comprises:

determining if variances of the values of the aging feature in the set of model-building sample data become larger with time, and performing a log transformation on each of the values of the aging feature in the set of model-building sample data when the variances of the values of the aging feature in the set of model-building sample data become larger with time;

performing a unit root test on the values of the aging feature in the set of model-building sample data to check if the values of the aging feature in the set of model-building sample data arranged in sequence is stationary, and performing a process of difference on each of the values of the aging feature in the set of model-building sample data when the values of the aging feature in the set of model-building sample data is not stationary.

14. The non-transitory tangible computer readable recording medium as claimed in claim 13, wherein the unit root test is an augmented Dickey-Fuller test (ADF test) or a Kwiatkowski-Phillips-Schmidt-Shin (KPSS) test.

15. The non-transitory tangible computer readable recording medium as claimed in claim 10, further comprising performing a second determination operation to determine if the component of the production tool needs replacement or maintenance, wherein the second determination operation comprises:

determining if $(RUL_t - RUL_{t-1})/RUL_{t-1}$ is greater than or equal to a threshold, thereby obtaining a first result, wherein t-1 stands for the $(t-1)^{th}$ workpiece;

determining if $RUL_t$ is smaller than a maintenance buffer time, thereby obtaining a second result, wherein the component of the production tool has to be maintained within the maintenance buffer time when being abnormal; wherein when the first result and the second result both are false, the component of the production tool is in a sick state but does not deteriorate drastically, and no maintenance is needed;

when the first result is false and the second result is true, the component of the production tool does not deteriorate drastically but its remaining useful life is sufficient, and maintenance is needed;

when the first result is true and the second result is false, the component of the production tool deteriorates drastically, and if the first result for each of the $t^{th}$ workpiece to the $(t+p)^{th}$ workpiece that are successively processed by the component of the production tool is true and the second result for the for each of the $t^{th}$ workpiece to the $(t+p)^{th}$ workpiece is false, inspection or maintenance is needed, wherein p is a positive integer; and when the first result and the second result both are true, the component of the production tool needs maintenance.

16. The non-transitory tangible computer readable recording medium as claimed in claim 10, further comprising performing a second determination operation to determine if the component of the production tool needs replacement or maintenance, wherein the second determination operation comprises:

converting the predicted values of the aging feature ($y_T$) to a plurality of death correlation indices (DCI) in accordance with a set of conversion formulas as follows:

$$DCI_t = \frac{conv(y_{death}, y_{t-1})}{Var(y_{death})},$$

wherein $y_{death}$ is the predicted value of the aging feature when the component cannot work, $y_{t-1}$ is the predicted value of the aging feature corresponding to the $(t-1)^{th}$ workpiece processed by the component, cony is the covariance computation, and Var is the variance computation; and when $DCI_t$ is greater than a threshold, it means that the component is neast a dead state when processimg the $t^{th}$ workpiece, wherein the threshold is based on a standard error of $DCI_t$.

17. The non-transitory tangible computer readable recording medium as claimed in claim 10, wherein the component comprises a heater, a pressure module, a throttle valve, an oilless bushing or a bearing, and the parameters comprise a valve opening angle, a vibration amplitude, a driving voltage, a driving current, a temperature and/or a pressure.

18. The non-transitory tangible computer readable recording medium as claimed in claim 10, wherein the parameter indicators comprise a k-times frequency feature (where k is greater than 0) after conversion to a frequency domain, a global similarity index (GSI), a kurtosis of statistic distribution, a skewness of statistic distribution, a standard deviation, a root mean square (RMS), a mean value, a maximum value, and/or a minimum value.

* * * * *